(12) United States Patent
Blanchard

(10) Patent No.: US 11,054,984 B2
(45) Date of Patent: Jul. 6, 2021

(54) GESTURE-BASED INPUT COMMAND INTERFACE, METHOD AND SYSTEM

(71) Applicant: Mehdi Blanchard, Allambie Heights (AU)

(72) Inventor: Mehdi Blanchard, Allambie Heights (AU)

( * ) Notice: Subject to any disclaimer, the term of this patent is extended or adjusted under 35 U.S.C. 154(b) by 75 days.

(21) Appl. No.: 16/316,203

(22) PCT Filed: Jul. 5, 2017

(86) PCT No.: PCT/AU2017/050696
§ 371 (c)(1),
(2) Date: Jan. 8, 2019

(87) PCT Pub. No.: WO2018/006129
PCT Pub. Date: Jan. 11, 2018

(65) Prior Publication Data
US 2020/0174654 A1    Jun. 4, 2020

(30) Foreign Application Priority Data
Jul. 8, 2016    (AU) .............................. 2016902696

(51) Int. Cl.
*G06F 3/0488*    (2013.01)
*G06F 3/041*    (2006.01)

(52) U.S. Cl.
CPC ...... *G06F 3/04883* (2013.01); *G06F 3/04186* (2019.05); *G06F 2203/04104* (2013.01); *G06F 2203/04808* (2013.01)

(58) Field of Classification Search
CPC ............. G06F 3/04883; G06F 3/04186; G06F 2203/04104; G06F 2203/04808
See application file for complete search history.

(56) References Cited

U.S. PATENT DOCUMENTS 7,030,861 B1    4/2006  Westerman et al.
2007/0040813 A1*  2/2007  Kushler .............. G06F 3/04883
                                                  345/173

(Continued)

FOREIGN PATENT DOCUMENTS

AU  PCT/AU2017/050696    7/2017

OTHER PUBLICATIONS

International Search Report dated Sep. 18, 2017 issued in PCT International Patent Application No. PCT/AU2017/050696, 18 pp.

*Primary Examiner* — Mong-Shune Chung
(74) *Attorney, Agent, or Firm* — Nixon & Vanderhye P.C.

(57) ABSTRACT

In a method for providing an input command to a computing device, the computing device includes a multi-touch sensitive interface, one or more processors adapted to control the multi-touch sensitive interface and to receive input data therefrom, and memory adapted for storage of computer instructions. The method may include monitoring the multi-touch sensitive interface for multi-touch input data corresponding to a user desire to input textural data to the computing device, controlling the multi-touch interface to define a first plurality of input locations corresponding to the location of the multi-touch input data, receiving touch signal data in respect of one or more of the input locations, correlating the touch signal data to an input command, and processing the input command using the one or more processors to perform an action associated with the input command.

9 Claims, 22 Drawing Sheets

(56) References Cited

U.S. PATENT DOCUMENTS

| | | | |
|---|---|---|---|
| 2007/0177803 A1 | 8/2007 | Elias et al. | |
| 2010/0259561 A1* | 10/2010 | Forutanpour | G06F 3/0237 345/660 |
| 2012/0256860 A1 | 10/2012 | Justice | |
| 2013/0207920 A1 | 8/2013 | McCann et al. | |
| 2014/0098024 A1* | 4/2014 | Paek | G06F 3/04883 345/168 |
| 2014/0298266 A1* | 10/2014 | Lapp | G06F 3/04886 715/835 |
| 2014/0325443 A1* | 10/2014 | Kim | G06F 3/0482 715/825 |
| 2017/0052702 A1* | 2/2017 | Norris, III | G06F 3/04883 |

* cited by examiner

Step 1: Longest distance

Step 2: Smallest gap

Step 3: Closest point

Rest Pose

Pinch In

| Trainer |
|---|
| BEGINNER |
| ETAO |
| HINRS |
| LDCU |
| MFP |
| GWYB |
| VKX |
| JQZ |
| INTERMEDIATE |
| ETAO - HINRS |
| ETAO - LDCU |
| ETAO - MFP |
| ETAO - GWYB |
| ETAO - VKX |
| ETAO - JQZ |
| ADVANCED |
| ALPHABET |
| PANGRAMS |
| ALL LETTERS |
| TEXT |
| SPECIAL |
| PUNCTUATION: .,'" |
| PUNCTUATION: -_/?: |

Figure 19

GESTURE-BASED INPUT COMMAND INTERFACE, METHOD AND SYSTEM

CROSS-REFERENCES TO RELATED APPLICATIONS

This application is the U.S. national phase of International Application No. PCT/AU2017/050696 filed Jul. 5, 2017 which designated the U.S. and claims priority to Australian Patent Application No. 2016902696 filed Jul. 8, 2016, the entire contents of each of which are hereby incorporated by reference.

FIELD OF THE INVENTION

The present invention relates to input devices and applications for electronic devices and in particular to input devices and applications for electronic devices comprising a touch-sensitive interface.

The invention has been developed primarily for use in methods and systems for input devices and applications for electronic devices comprising a multi-touch-sensitive interface and will be described hereinafter with reference to this application. However, it will be appreciated that the invention is not limited to this particular field of use.

BACKGROUND

Any discussion of the background art throughout the specification should in no way be considered as an admission that such background art is prior art nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

Since the invention of typewriters in 1860, keyboards have changed from mechanical (typewriters) to electronic (computers) and now virtual (smartphones and tablet computers). In 2015, the concept of touch-typing with 2 hands on a physical keyboard utilising the QWERTY layout remains the standard method of typing and to provide data input to computing or electronic devices. Physical keyboards include physical, depressible buttons that correspond to different characters and functions. The average typing speed is 40 words per minute on a standard electronic physical keyboard device.

When a user is inputting text on a mobile computing device such as, for example, a tablet or smartphone device, the average typing speed is likely to decrease significantly due to one or more of:

The lack of locator protrusions on keys (e.g.: a small raised bump as is often applied to the F and J on a common physical QWERTY keyboard hardware device) and the lack of mechanical feedback, which forces the user to look permanently at the tablet's screen while typing to ensure correct registration and entry of each character typed;

The limited size of the keyboard (i.e. restricted by the size of the touch interface—in the case of mobile computing devices corresponding to the touch-sensitive display interface), which makes keys smaller and makes accessing additional characters cumbersome (e.g.: punctuation); and/or The even more limited size on smart phones where the user is more likely to use only a couple of fingers (typically only one) rather than both hands (or even all the fingers of a single hand).

By occupying a significant amount of real estate on the touch-sensitive screen of a mobile computing device such as a smartphone or tablet device, applications need to take into account that a virtual keyboard will occasionally pop up and down, which will hide part of the application.

On a mobile computing device such as a smartphone or tablet device, the keyboard typically appears on the touch-sensitive display surface only when the user selects an editable field. This process is not conducive for using keyboard shortcuts in an application, which are invaluable in terms of operational speed and efficiency when using computing devices.

Standard keyboards input devices consume a large proportion of the working platform (e.g. a desk) and are a one-size-fits-all device where a young child and a professional basketball player must share the same key sizes and spacing despite having vastly differently sized hands. Also, people with disabilities might have difficulties to use a full sized electronic or virtual keyboard.

SUMMARY

It is an object of the present invention to overcome or ameliorate at least one or more of the disadvantages of the prior art, or to provide a useful alternative.

One arrangement provides a computer program product for performing a method as described herein.

One arrangement provides a non-transitive carrier medium for carrying computer executable code that, when executed on a processor, causes the processor to perform a method as described herein.

One arrangement provides a system configured for performing a method as described herein.

According to a first aspect of the present invention, there is provided a method for providing a input command to a computing device. The computing device may comprise a multi-touch sensitive interface. The computing device may further comprise one or more processors adapted to control the multi-touch sensitive interface and to receive input data therefrom. The computing device may further comprise memory adapted for storage of computer instructions. The method may comprise the step of monitoring the multi-touch sensitive interface for multi-touch input data corresponding to a user desire to input textural data to the computing device. The method may further comprise the step of controlling the multi-touch interface to define a plurality of input locations corresponding to the location of the multi-touch input data. The method may further comprise the step of receiving touch signal data in respect of one or more of the input locations. The method may further comprise the step of correlating the touch signal data to an input command. The method may further comprise the step of processing the input command using the one or more processors to perform an action associated with the input command.

According to a particular arrangement of the first aspect, there is provided a method for providing a input command to a computing device, the computing device comprising: a multi-touch sensitive interface; one or more processors adapted to control the multi-touch sensitive interface and to receive input data therefrom; and memory adapted for storage of computer instructions; the method comprising the steps of: monitoring the multi-touch sensitive interface for multi-touch input data corresponding to a user desire to input textural data to the computing device; controlling the multi-touch interface to define a plurality of input locations corresponding to the location of the multi-touch input data; receiving touch signal data in respect of one or more of the input locations; correlating the touch signal data to an input command; and processing the input command using the one or more processors to perform an action associated with the input command.

In the case where the touch interface is configured to provide keyboard input commands to the computing device, the control commands may comprise a command or partial command for selecting a desired lookup table of textural characters associated with the multi-touch input data. The control command may comprise a command for activating an input command modifier. The input command modifier may comprise one or more of a SHIFT, ALT or CTRL key input modifier command. The input command may correspond to a command to input a textural input to the computing device. Alternatively, the interface may be configured to provide non-textural input commands to a device e.g. to a remote control, a car or an airplane in order to provide command inputs that typically required user input via buttons or switches on a command console associated with the device. For example in the example of a touch interface configured to provide user command input to a car, the gesture-based commands input by the user via the touch interface may be configured to perform actions such as, for example, open or close the car windows, activate radio or phone controls, wipers, cruise control, lights, electric mirrors, tank lid, seat adjustment, air conditioning, etc.

The one or more processors may be further adapted to monitor location data corresponding to multi-touch input data from user interactions on the touch sensitive interface corresponding to the multi-touch input data and store the location data in memory. The one or more processors may be further adapted to compare the location data with the centre of the input locations. The one or more processors may be further adapted to, from the comparison, determine a drift in the natural location of each of user's finger positions with respect to the input locations. The one or more processors may be further adapted to, where a drift is determined re-define the location of each input location where a drift is detected in accordance with the location data, such as to reposition the input locations in accordance with the natural location of the user's fingers.

According to a second aspect of the invention, there is provided system for providing an input command to a computing device. The computing device may comprise a multi-touch sensitive interface. The computing device may further comprise one or more processors adapted to control the multi-touch sensitive interface and to receive input data therefrom. The computing device may further comprise memory adapted for storage of computer instructions.

The system may comprise computer code instructions stored in the memory and adapted for defining a plurality of input locations on the multi-touch sensitive interface.

The system may further comprise computer code instruction means for receiving single- or multi-touch input from the input locations. The system may further comprise computer code instruction means for correlating the touch signal data to an input command. The system may further comprise computer code instruction means for processing the input command using the one or more processors to perform an action associated with the input command.

According to a particular arrangement of the second aspect, there is provided a system for providing a input command to a computing device, the computing device comprising: a multi-touch sensitive interface; one or more processors adapted to control the multi-touch sensitive interface and to receive input data therefrom; and memory adapted for storage of computer instructions; the system comprising: computer code instructions stored in the memory and adapted for defining a plurality of input locations on the multi-touch sensitive interface; computer code instruction means for: receiving single- or multi-touch input from the input locations; correlating the touch signal data to an input command; and processing the input command using the one or more processors to perform an action associated with the input command.

The plurality of input locations may be located according to the natural resting position of the fingers and thumb of at least one hand of a user.

The input command may comprise a command to input a textural character to the computing device. The input command may alternately comprise a control command. The control command may comprise a command or partial command for selecting a desired lookup table of textural characters associated with the multi-touch input data.

The control command may comprise a command for activating an input command modifier. The input command modifier may comprise on or more of a SHIFT, ALT or CTRL key input modifier command.

According to a third aspect of the invention there is provided a computer program product having a computer readable medium having a computer program recorded therein for input command input to a computing device. The computing device may comprise a multi-touch sensitive interface. The computing device may further comprise one or more processors adapted to control the multi-touch sensitive interface and to receive input data therefrom. The computing device may further comprise memory adapted for storage of computer instructions. The computer program product may comprise computer program code means for monitoring the multi-touch sensitive interface for multi-touch input data corresponding to a user desire to input textural data to the computing device. The computer program product may further comprise computer program code means for controlling the multi-touch interface to define a plurality of input locations corresponding to the location of the multi-touch input data. The computer program product may further comprise computer program code means for receiving touch signal data in respect of one or more of the input locations. The computer program product may further comprise computer program code means for correlating the touch signal data to an input command. The computer program product may further comprise computer program code means for processing the input command using the one or more processors to perform an action associated with the input command.

According to a particular arrangement of the third aspect, there is provided a computer program product having a computer readable medium having a computer program recorded therein for input command to a computing device: the computing device comprising: a multi-touch sensitive interface; one or more processors adapted to control the multi-touch sensitive interface and to receive input data therefrom; and memory adapted for storage of computer instructions; the computer program product comprising:

computer program code means for monitoring the multi-touch sensitive interface for multi-touch input data corresponding to a user desire to input textural data to the computing device; computer program code means for controlling the multi-touch interface to define a plurality of input locations corresponding to the location of the multi-touch input data; and computer program code means for receiving touch signal data in respect of one or more of the input locations; computer program code means for correlating the touch signal data to an input command; and computer program code means for processing the input command using the one or more processors to perform an action associated with the input command.

According to a fourth aspect of the invention, there is provided a computer program element comprising computer program code means to make a computer execute a procedure to provide a input command to a computing device. The computing device may comprise a multi-touch sensitive interface. The computing device may further comprise one or more processors adapted to control the multi-touch sensitive interface and to receive input data therefrom. The computing device may further comprise memory adapted for storage of computer instructions. The procedure may comprise the step of monitoring the multi-touch sensitive interface for multi-touch input data corresponding to a user desire to input textural data to the computing device. The procedure may comprise the further step of controlling the multi-touch interface to define a plurality of input locations corresponding to the location of the multi-touch input data. The procedure may comprise the further step of receiving touch signal data in respect of one or more of the input locations. The procedure may comprise the further step of correlating the touch signal data to an input command. The procedure may comprise the further step of processing the input command using the one or more processors to perform an action associated with the input command.

According to a particular arrangement of the fourth aspect, there is provided a computer program element comprising computer program code means to make a computer execute a procedure to provide a input command to a computing device, the computing device comprising: a multi-touch sensitive interface; one or more processors adapted to control the multi-touch sensitive interface and to receive input data therefrom; and memory adapted for storage of computer instructions; the procedure comprising the steps of: monitoring the multi-touch sensitive interface for multi-touch input data corresponding to a user desire to input textural data to the computing device; controlling the multi-touch interface to define a plurality of input locations corresponding to the location of the multi-touch input data; receiving touch signal data in respect of one or more of the input locations; correlating the touch signal data to an input command; and processing the input command using the one or more processors to perform an action associated with the input command.

According to a fifth aspect of the invention, there is provided a computer readable medium, having a program recorded thereon, where the program is configured to make a computer execute a procedure to provide an input command to a computing device. The computing device may comprise a multi-touch sensitive interface. The computing device may further comprise one or more processors adapted to control the multi-touch sensitive interface and to receive input data therefrom. The computing device may further comprise memory adapted for storage of computer instructions. The procedure may comprise the step of monitoring the multi-touch sensitive interface for multi-touch input data corresponding to a user desire to input textural data to the computing device. The procedure may comprise the further step of controlling the multi-touch interface to define a plurality of input locations corresponding to the location of the multi-touch input data. The procedure may comprise the further step of receiving touch signal data in respect of one or more of the input locations. The procedure may comprise the further step of correlating the touch signal data to an input command. The procedure may comprise the further step of processing the input command using the one or more processors to perform an action associated with the input command.

According to a particular arrangement of the fifth aspect, there is provided a computer readable medium, having a program recorded thereon, where the program is configured to make a computer execute a procedure to provide an input command input to a computing device, the computing device comprising: a multi-touch sensitive interface; one or more processors adapted to control the multi-touch sensitive interface and to receive input data therefrom; and memory adapted for storage of computer instructions; the procedure comprising the steps of: monitoring the multi-touch sensitive interface for multi-touch input data corresponding to a user desire to input textural data to the computing device; controlling the multi-touch interface to define a plurality of input locations corresponding to the location of the multi-touch input data; receiving touch signal data in respect of one or more of the input locations; correlating the touch signal data to an input command; and processing the input command using the one or more processors to perform an action associated with the input command.

The procedure may further comprise the step of calculating an arc with respect to the natural arc of motion of each of the user's fingers.

The procedure may further comprise the step of defining a second plurality of input locations on the multi-touch sensitive interface, each of the second plurality of input locations being associated with a respective input location of the first plurality of input locations to form a plurality of associated pairs of input locations.

According to a sixth aspect of the invention, there is provided an apparatus for providing an input command to a computing device. The apparatus may comprise a multi-touch-sensitive interface. The apparatus may further comprise one or more processors in electronic communication with the multi-touch-sensitive interface. The processor may be adapted to define a first and second plurality of input locations on the multi-touch-sensitive interface. The processor may be further adapted to monitor the multi-touch sensitive interface for multi-touch input data corresponding to a user desire to input textural data to the computing device. The processor may be further adapted to communicate the input data to the computing device via a wireless communication module.

According to a particular arrangement of the sixth aspect, there is provided an apparatus for providing an input command input to a computing device comprising: a multi-touch-sensitive interface; one or more processors in electronic communication with the multi-touch-sensitive interface, the processor being adapted to: define a first and second plurality of input locations on the multi-touch-sensitive interface; monitoring the multi-touch sensitive interface for multi-touch input data corresponding to a user desire to input textural data to the computing device; and communicating the input data to the computing device via a wireless communication module.

The apparatus may be adapted for integrated disposition in an article of clothing.

The apparatus may be adapted for integrated disposition in a mobility device. The mobility device may comprise a wheelchair.

In particular arrangements of the invention according to one or more of the above aspects, there is provided an input command interface adapted to be executed in conjunction with a touch-sensitive or gesture-enabled surface connected to a computing device, such as for example a mobile computing device (e.g. smartphone or tablet device), a desktop computing device, a laptop computing device and the like. For example the input command interface can run directly on the screen of a mobile computing device, and it can also run using a touchpad connected to a desktop or a laptop computer e.g. either integrally formed with the computing device or an external touchpad device connected to the computing device via a convenient connection means such as a wired connection means, e.g. USB, or a wireless connection means e.g. Bluetooth.

In particular arrangements of the invention according to the above aspects, there is provided a input command interface that can be used with only one hand, while still providing at least comparable average typing speeds as the current average typing speed on a standard keyboard hardware device.

In further arrangements of the invention according to the above aspects, the input command interface can mirror itself left to right such that it can be used equally as effectively for both left handed or right handed users and retain exactly the same features and optimizations.

A particular advantage of the invention according to the above aspects is that the intuitive nature of the input interface, the user does not need to look at the interface while typing, hence providing a note-taking tool that does not disrupt the user's flow of thought (or, for example, the conversation during meetings and presentations). This could also be an advantage for people running simulations or playing video games.

Particular arrangements of the invention according to the above aspects utilise the natural motion of the fingers based on anatomy to detect gestures that can be mapped to keyboard keys or commands By using swipes and pinches based on the bones' pivot points, the typing process is enhanced.

Particular arrangements of the invention according to the above aspects are configured to adapt the keyboard to the size of the user's hand(s). When the user places his/her hand(s) on the touch-sensitive interface of the computing device, the locations where the user's fingers and thumb(s) contact the touch-sensitive interface while in their natural rest position defines the plurality of input locations for the keyboard, and therefore fit perfectly to the user's hand size and rest position.

Particular arrangements of the invention according to the above aspects are adapted to track any drifting motion of the hand/fingers as the user uses the touch interface. After initially setting the input locations of the input interface, the user's hand is likely to drift from its original position. The system tracks the motion of the fingers and constantly re-adjusts the location of the input locations on the touch-sensitive interface to best fit the current fingers' location.

A particular advantage of the arrangements of the above aspects include that the computing device does not require a virtual keyboard to pop up and down within an application as the entire touch-sensitive interface can be used and the input command interface according to the above aspects as disclosed herein may be overlaid on top of the particular software application that the user is interacting with. This provides the further advantage that it allows a user to interact with an application in a similar manner as through the use of keyboard shortcuts.

In a further aspect of the apparatus, systems and methods as disclosed herein, there is provided a system and method for providing an input command interface to a computing device according to the preceding aspects further comprising means to be able to easily optimize the keys for a user's preferred or desired language(s). Gestures associated with the input command interface system and/or method are advantageously sorted based on their complexity and the simpler gestures are used for the most commonly used keys.

In a further aspect of the apparatus, systems and methods as disclosed herein, there is provided a system and method for providing an input command interface to a computing device according to the preceding aspects further comprising means for providing a keyboard interface which is fully configurable to adjust to the user's needs, the user's language(s), and the specific needs of one or more software applications installed on the computing device. The system and method according to any one of the preceding aspects, may further incorporate use of a cloud-based exchange system whereby a user is provided the ability to store personalised custom keyboard configurations on a storage medium accessible by a public network such as the internet. In this manner, a user can readily switch computing devices whilst still retaining all of their personalised custom keyboard configurations or optimisations from any location worldwide. Alternatively, a user may store a particular customised or optimised keyboard layout map on a publically accessible storage device such as a cloud server. The user may optionally make their personalised customised layout configurations accessible for third party users of the system or method disclosed in the above aspects. Similarly, a particular user may download the layout configurations provided by other third party users for installation and use on their personal computing device.

The particular arrangements of an apparatus, systems or method according to any one or more of the preceding aspects, provide significant advantages to people which have a disabilities that may prevent them from using a standard keyboard. For example, particular arrangements of the method and/or system according to any one or more of the preceding aspects provide a user interface keyboard which: uses a smaller footprint on the touch-sensitive interface of the computing device; can be configured according to the individual's particular needs; can be operated simply without requiring the user to strike or make contact with fixed physical keys or touch-screen locations such that the user can operate the input command interface without looking at the keys/touch locations.

The particular arrangements of an apparatus, system or method according to any one or more of the preceding aspects provide the option for several memory banks associated with desired input characters to be able to store a lot more keys than just the standard QWERTY keyboard keys. A further advantage of the presently disclosed methods and systems also provide a input command interface which enables the user access to application shortcuts associated with software application programs installed on the user's computing device including: quick text input, or any additional function provided by a particular software application.

A further advantage of the input interface described in the apparatus, systems and methods disclosed herein is that is provide a user with a means to type input commands to a computing device privately.

In particular arrangements, particularly associated with mobile computing devices such as smartphones or tablet devices comprising a touch-sensitive display device, the touch-sensitive display device of the mobile computing device can be utilised as the multi-touch sensitive interface required for operation of the presently disclosed systems and methods of command and/or text input. In particular arrangements, the method may comprise controlling the multi-touch display interface of the mobile computing device to display an image with respect to the first and/or second plurality of input locations corresponding to the location on the interface of the multi-touch input data.

In further arrangements of the methods and systems disclosed herein, the textural interface provided by the apparatus, systems and methods disclosed herein can be implemented on any touch-sensitive interface and can, for example, be implemented on a touch sensitive device on a desk, a touch sensitive device integrated into a mobility device such as a wheelchair, or alternatively, on a flexible touch sensitive device which may be able to be integrated into an item of the user's clothing, for example, sewn on the thigh of a pair of pants.

In further arrangements of the apparatus, systems and methods disclosed herein, the input command interface can also be adapted for use with 2 hands to increase the user's typing speed using the apparatus if desired, provided of course that the touch-sensitive interface is a multi-touch sensitive interface capable of tracking and registering up to 10 simultaneous gestures.

BRIEF DESCRIPTION OF THE DRAWINGS

Notwithstanding any other forms which may fall within the scope of the present invention, a preferred embodiment/preferred embodiments of the invention will now be described, by way of example only, with reference to the accompanying drawings in which:

FIG. 14 shows two screens to let the user define Keysets. The first screen shows how the user can activate, de-activate and create Keysets. The second screen shows the list of Keys that a Keyset contains and allows the user to add, edit or remove its Keys;

FIG. 15 shows an interface used to define a Key. A Key belongs to a Keyset and is defined by a gesture, some content, a group, a rank, and a memory bank number;

FIG. 19 shows the training module with an example of progressive lessons from Beginner to Advanced;

DEFINITIONS

Figure 1A:
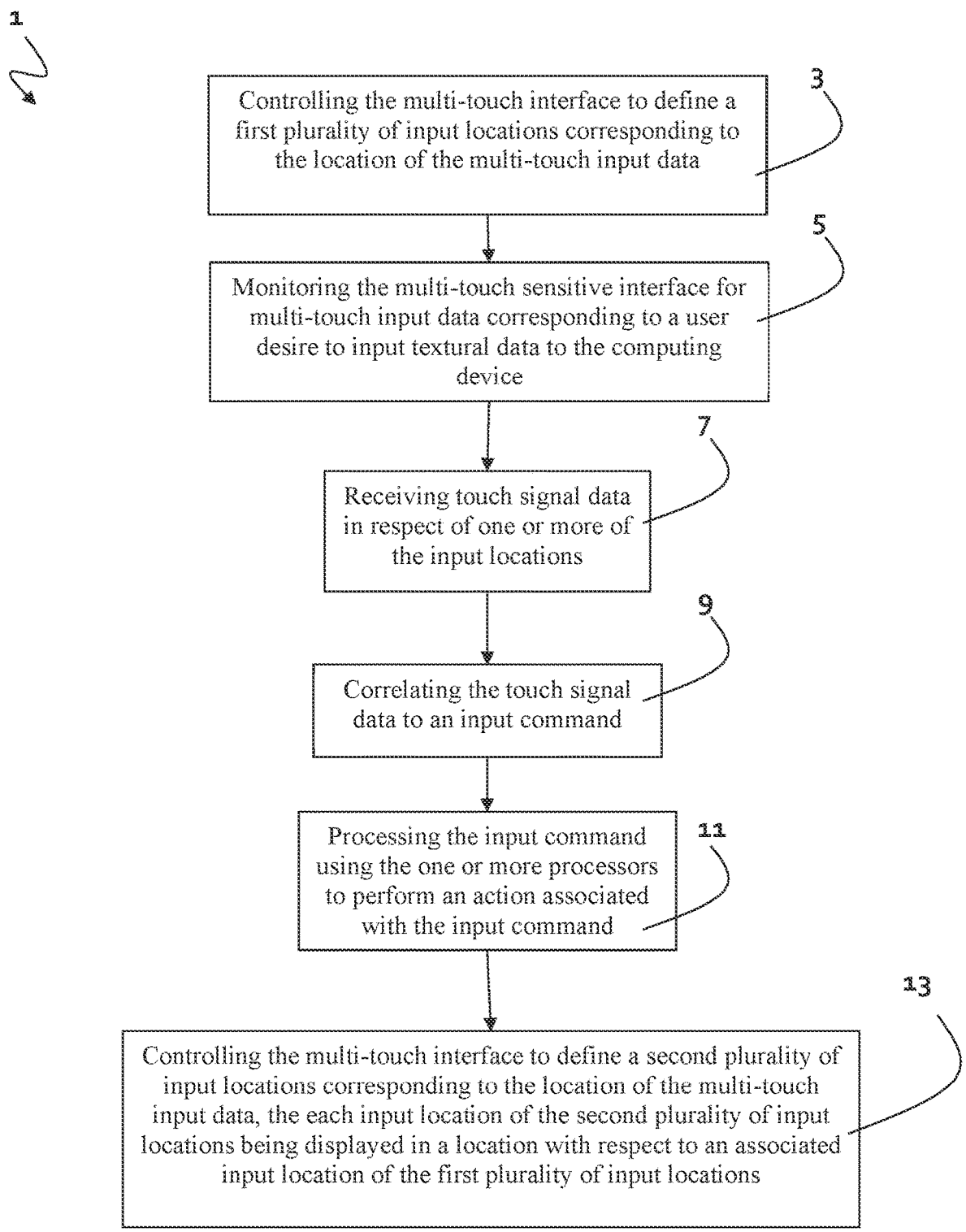
FIG. 1A depicts a method 1 for providing an input command input to a computing device.

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. It will be further understood that terms used herein should be interpreted as having a meaning that is consistent with their meaning in the context of this specification and the relevant art and will not be interpreted in an idealized or overly formal sense unless expressly so defined herein. For the purposes of the present invention, additional terms are defined below. Furthermore, all definitions, as defined and used herein, should be understood to control over dictionary definitions, definitions in documents incorporated by reference, and/or ordinary meanings of the defined terms unless there is doubt as to the meaning of a particular term, in which case the common dictionary definition and/or common usage of the term will prevail.

For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity. The use of the word 'about' to qualify a number is merely an express indication that the number is not to be construed as a precise value.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Any one of the terms: "including" or "which includes" or "that includes" as used herein is also an open term that also means including at least the elements/features that follow the term, but not excluding others. Thus, "including" is synonymous with and means "comprising".

The term, "real-time", for example "displaying real-time data" refers to the display of the data without intentional delay, given the processing limitations of the system and the time required to accurately measure the data.

The term. "near-real-time", for example "obtaining real-time or near-real-time data" refers to the obtaining of data either without intentional delay ("real-time") or as close to real-time as practically possible (i.e. with a small, but minimal, amount of delay whether intentional or not within the constraints and processing limitations of the of the system for obtaining and recording or transmitting the data.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the summary above and the description below, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" alone shall be closed or semi-closed transitional phrases, respectively.

For the purpose of this specification, where method steps are described in sequence, the sequence does not necessarily mean that the steps are to be carried out in chronological order in that sequence, unless there is no other logical manner of interpreting the sequence.

In addition, where features or aspects of the invention are described in terms of Markush groups, those skilled in the art will recognise that the invention is also thereby described in terms of any individual member or subgroup of members of the Markush group.

DETAILED DESCRIPTION

It should be noted in the following description that like or the same reference numerals in different embodiments denote the same or similar features.

Input Command Interface for Touch-Sensitive Devices

Referring to FIG. 1, there is depicted a method 1 for providing an input command to a computing device, where the computing device comprises: a multi-touch sensitive interface; one or more processors adapted to control the multi-touch sensitive interface and to receive input data therefrom; and memory adapted for storage of computer instructions.

Method 1 comprise the step of controlling 3 the multi-touch interface to define a first plurality of input locations corresponding to the location of the multi-touch input data. In particular arrangements, where the computing device comprises a mobile computing device such as a smartphone or tablet device comprising a touch-sensitive display interface, then method 1 may comprise the step of controlling 3 the multi-touch display interface to display an image with respect to the first plurality of input locations corresponding to the location of the multi-touch input data. Method 1 further comprises the step of monitoring 5 the multi-touch sensitive interface for multi-touch input data corresponding to a user desire to input textural data to the computing device. Method 1 further comprises the step of receiving 7 touch signal data in respect of one or more of the input locations. Method 1 further comprises the step of correlating 9 the touch signal data to an input command Method 1 further comprises the step of processing 11 the input command using the one or more processors to perform an action associated with the input command.

In the case where the touch interface is configured to provide keyboard input commands to the computing device, the input command comprises either a command to input a textural character to the computing device; or a control command, where a control command comprises a command or partial command for selecting a desired lookup table of textural characters associated with the multi-touch input data. The control command may selectively comprises a command for activating a input command modifier. In this example with reference to a computer keyboard replacement, the input command modifier comprises one or more of a SHIFT, ALT or CTRL key input modifier command, or similar input modifier key as may be found on a typical physical keyboard device. Alternatively, the interface may be configured to provide non-textural input commands to a device e.g. to a remote control, a car or an airplane in order to provide command inputs that typically required user input via buttons or switches on a command console associated with the device. For example in the example of a touch interface configured to provide user command input to a car, the gesture-based commands input by the user via the touch interface may be configured to perform actions such as, for example, open or close the car windows, activate radio or phone controls, wipers, cruise control, lights, electric mirrors, tank lid, seat adjustment, air conditioning, etc.

The method 1 optionally further comprises controlling 13 the multi-touch interface to define a second plurality of input locations corresponding to the location of the multi-touch input data, the each input location of the second plurality of input locations being displayed in a location with respect to an associated input location of the first plurality of input locations. In particular arrangements, where the computing device comprises a mobile computing device such as a smartphone or tablet device comprising a touch-sensitive display interface, then method 1 may optionally further comprise controlling 13 the multi-touch interface to display an image with respect to the second plurality of input locations. An input location of the second plurality of input locations is located on a common arc with respect to the respective associated input location of the first plurality of input locations, to for a plurality of associated pairs of input location. The common arc of a selected associated pair of input locations is associated with the natural arc of motion of a user's finger.

As will be described in further detail below, the systems disclosed herein provide systems and methods for input command devices and applications for electronic devices comprising a multi-touch-sensitive interface which also comprises the display interface of the device and the following description and associated figures refer particularly to such arrangements where the computing device is a mobile computing device such as a smartphone or tablet device comprising a touch-sensitive display. However, it will be readily appreciated by the skilled addressee that the following description is also relevant to a touch-sensitive interface which does not also function as a display surface. FIG. 1B depicts a touch-sensitive interface 150 which as commonly included in mobile computing devices such as, for example, smartphone devices, tablet devices or hybrid tablet/laptop devices. The mobile computing device comprises a multi-touch sensitive display interface; one or more processors adapted to control the multi-touch sensitive display interface and to receive input data therefrom; and memory adapted for storage of computer instructions. Current methods of enabling a user to enter text to the computing device includes displaying a virtual QWERTY-style keyboard on the touchscreen display interface. Typically, however, the content being displayed on the device is not visible underneath the input command interface and/or the content is compressed to fit in the remainder of the display interface that is not being used for the input command interface.

An example arrangement 100 of the input command interface described by method 1 and further disclosed herein is depicted in FIG. 1B. In a particular arrangement, the input interface 100 contains 5 primary touch input locations 101 to 105, each corresponding to one input location defined with respect to location on the touch-sensitive interface and associated with each of the user's fingers and thumb. An additional touch input location 106 is optionally provided next to the thumb and four extended or secondary touch input locations 107 to 110 are optionally provided and arranged in close proximity to the primary touch input locations 101 to 105 associated with each of the index, the middle finger, the ring finger and the little finger primary input locations respectively. Each of the touch input locations 101 to 110 can easily be accessed without the user needing to move their wrist. The secondary touch input locations 106 to 110 may be optionally provided depending on the size of the touch-sensitive interface 150 of the hardware device. The input command interface 100 automatically adjusts to the size of the user's hand. Each key is conveniently numbered as follows: 1—for Thumb location 101, 2—for Index Finger location 102, 3—for Middle Finger location 103, 4—for Ring Finger location 104, 5—for Little Finger location 105. An additional key location 106 is placed next to the thumb towards the palm and is numbered 6. Four optional key touch input locations 107 to 110 are placed above the keys 2, 3, 4 and 5 at an easily accessible location; they are numbered 7, 8, 9 and 0 respectively.

Figure 1B:
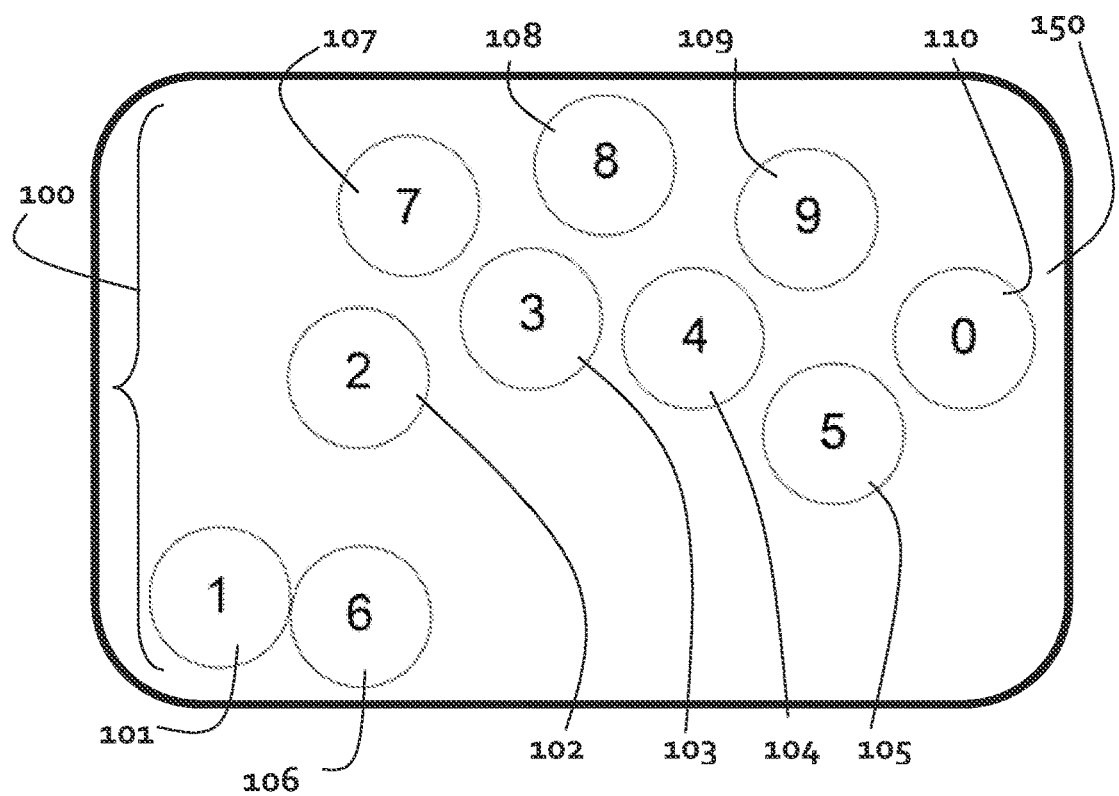
FIG. 1B shows an example arrangement of a virtual keyboard layout (including primary input locations and optional secondary input locations) corresponding to an input command interface for single-handed usage according to the present invention.

According to the present invention, when a keyboard is needed, the input interface 100 as depicted in FIG. 1A in a right-handed configuration is overlayed transparently on top of the existing content being displayed on the display interface 150 of the computing device such that the input interface can utilise the entire available area of the touch sensitive interface 150. For example when a user selects a text input field; instead of being presented with a keyboard that appears from the bottom of the screen, either taking up display interface real estate or compressing the displayed content, a new transparent layer 100 is added to the touch-sensitive interface 150 of the device in order to process finger gesture detection for input command. The transparent keyboard layer 100 is discarded when the text input is completed. A slightly different operating mode may be used for any different applications like for example a Notepad application or a Game application where the transparent keyboard layer may be permanently added on top of the content so that it can be used for typing text and also for keyboard shortcuts.

In further arrangements, the input interface 100 may be provided in conjunction with a specific input hardware device, such as, for example:

A touchpad interface integrated with or connected to a desktop or a laptop computer, A touchpad interface integrated with or interfaced to a mobility device such as a wheelchair, A flexible touch device integrally incorporated (e.g. sewn) into an article of clothing such as, for example, a pair of pants.

The computing device with which the touch-sensitive interface 150 is associated (e.g. mobile computing device such as a smartphone or tablet computing device, or a desktop computer or laptop computer) converts the gesture movements, received from the touch device, into a signal associated with a particular textural character input or textural modifier or selection signal as per requirements and as further disclosed herein.

Computing Device

Figure 4:
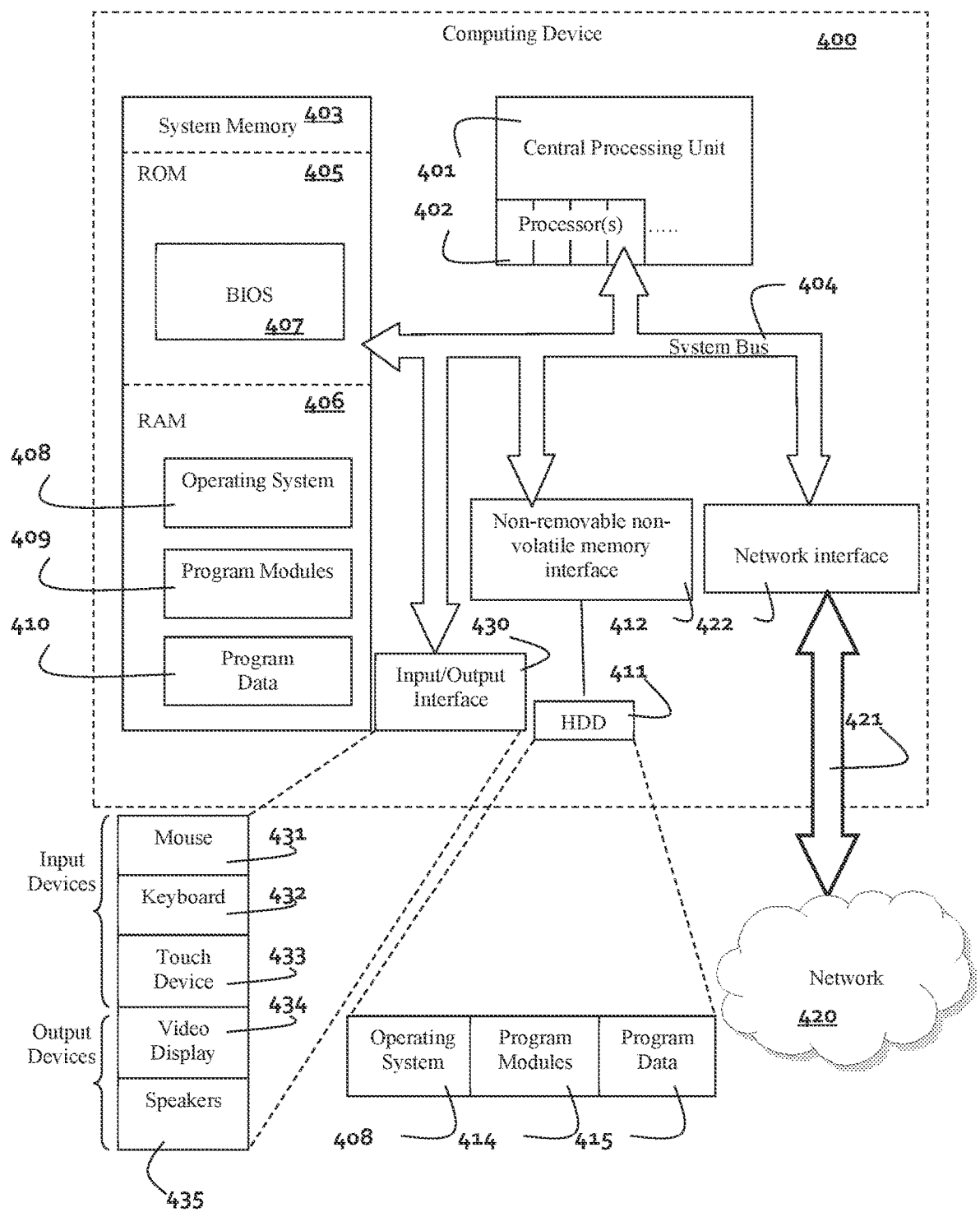
FIG. 4 shows a computing device on which the various embodiments described herein may be implemented in accordance with an embodiment of the present invention.

FIG. 4 shows a computing device 400. In particular arrangements, the computing device 200 takes the form of, for example a mobile computing device comprising a touch-sensitive input device or a desktop or laptop computer system comprising a touch-sensitive input device connected thereto. In this manner, the computing device 400 is adapted to comprise functionality for communication with the network 110 (for example, the internet), storage capability (such as the database 103) for storing user account data and the like.

In particular the steps of the methods and systems for input command devices and applications for electronic devices comprising a multi-touch-sensitive interface, as described herein, may be implemented as computer program code instructions executable by the computing device 400. The computer program code instructions may be divided into one or more computer program code instruction libraries, such as dynamic link libraries (DLL), wherein each of the libraries performs a one or more steps of the method. Additionally, a subset of the one or more of the libraries may perform The methods of 1, 1100, 1150, 1600 and 1700 depicted in FIGS. 1, 11A, 11B, 16 and 17 may be implemented using a computing device/computer system 400, such as that shown in FIG. 4 wherein the processes of FIGS. 1, 11A, 11B, 16 and 17 may be implemented as software, such as one or more application programs executable within the computing device 400. In particular, the steps of method(s) 1, 1100, 1150, 1600 and 1700 are effected by instructions in the software that are carried out within the computer system 400. The instructions may be formed as one or more code modules, each for performing one or more particular tasks. The software may also be divided into two separate parts, in which a first part and the corresponding code modules performs the described methods and a second part and the corresponding code modules manage a user interface between the first part and the user. The software may be stored in a computer readable medium, including the storage devices described below, for example. The software is loaded into the computer system 400 from the computer readable medium, and then executed by the computer system 400. A computer readable medium having such software or computer program recorded on it is a computer program product. The use of the computer program product in the computer system 400 preferably effects an advantageous apparatus for methods and systems for input command devices and applications for electronic devices comprising a multi-touch-sensitive interface.

With reference to FIG. 4, an exemplary computing device 400 is illustrated. The exemplary computing device 400 can include, but is not limited to, one or more central processing units (CPUs) 401 comprising one or more processors 402, a system memory 403, and a system bus 404 that couples various system components including the system memory 403 to the processing unit 401. The system bus 404 may be any of several types of bus structures including a memory bus or memory controller, a peripheral bus, and a local bus using any of a variety of bus architectures.

The computing device 400 also typically includes computer readable media, which can include any available media that can be accessed by computing device 400 and includes both volatile and non-volatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 403 includes computer storage media in the form of volatile and/or non-volatile memory such as read only memory (ROM) 405 and random access memory (RAM) 406. A basic input/output system 407 (BIOS), containing the basic routines that help to transfer information between elements within computing device 400, such as during start-up, is typically stored in ROM 405. RAM 406—typically contains data and/or program modules that are immediately accessible to and/or presently being operated on by processing unit 401. By way of example, and not limitation, FIG. 4 illustrates an operating system 408, other program modules 409, and program data 410.

The computing device 400 may also include other removable/non-removable, volatile/non-volatile computer storage media. By way of example only, FIG. 4 illustrates a hard disk drive 411 that reads from or writes to non-removable, non-volatile magnetic media. Other removable/non-removable, volatile/non-volatile computer storage media that can be used with the exemplary computing device include, but are not limited to, magnetic tape cassettes, flash memory cards, digital versatile disks, digital video tape, solid state RAM, solid state ROM, and the like. The hard disk drive 411 is typically connected to the system bus 404 through a non-removable memory interface such as interface 412.

The drives and their associated computer storage media discussed above and illustrated in FIG. 4, provide storage of computer readable instructions, data structures, program modules and other data for the computing device 400. In FIG. 4, for example, hard disk drive 411 is illustrated as storing an operating system 44408, other program modules 414, and program data 415. Note that these components can either be the same as or different from operating system 408, other program modules 409 and program data 410. Operating system 44408, other program modules 414 and program data 415 are given different numbers hereto illustrate that, at a minimum, they are different copies.

The computing device also includes one or more input/output (I/O) interfaces 430 connected to the system bus 404 including an audio-video interface that couples to output devices including one or more of a video display 434 and loudspeakers 435. Input/output interface(s) 430 also couple(s) to one or more input devices including, for example a mouse 431, keyboard 432 or touch sensitive device 433 such as for example a smartphone or tablet device.

Of relevance to the descriptions below, the computing device 400 may operate in a networked environment using logical connections to one or more remote computers. For simplicity of illustration, the computing device 400 is shown in FIG. 4 to be connected to a network 420 that is not limited to any particular network or networking protocols, but which may include, for example Ethernet, Bluetooth or IEEE 802.X wireless protocols. The logical connection depicted in FIG. 4 is a general network connection 421 that can be a local area network (LAN), a wide area network (WAN) or other network, for example, the internet. The computing device 400 is connected to the general network connection 421 through a network interface or adapter 422 which is, in turn, connected to the system bus 404. In a networked environment, program modules depicted relative to the computing device 400, or portions or peripherals thereof, may be stored in the memory of one or more other computing devices that are communicatively coupled to the computing device 400 through the general network connection 421. It will be appreciated that the network connections shown are exemplary and other means of establishing a communications link between computing devices may be used.

Hand Detection and Finger's Motion Path

Figure 2:
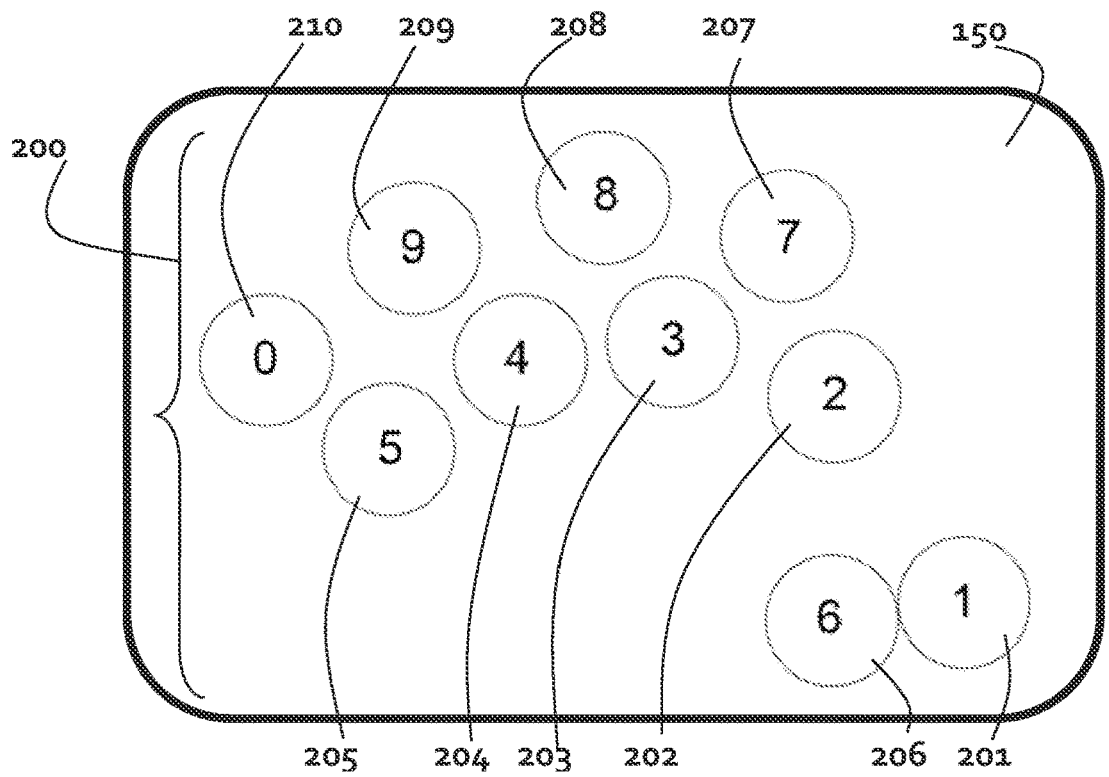
FIG. 2 describes the virtual keyboard layout corresponding to an input command interface adapted for left handed users. This is a mirrored copy of the input interface described in FIG. 1. The numbers are matching the same fingers as the right-handed input interface.
Figure 6:
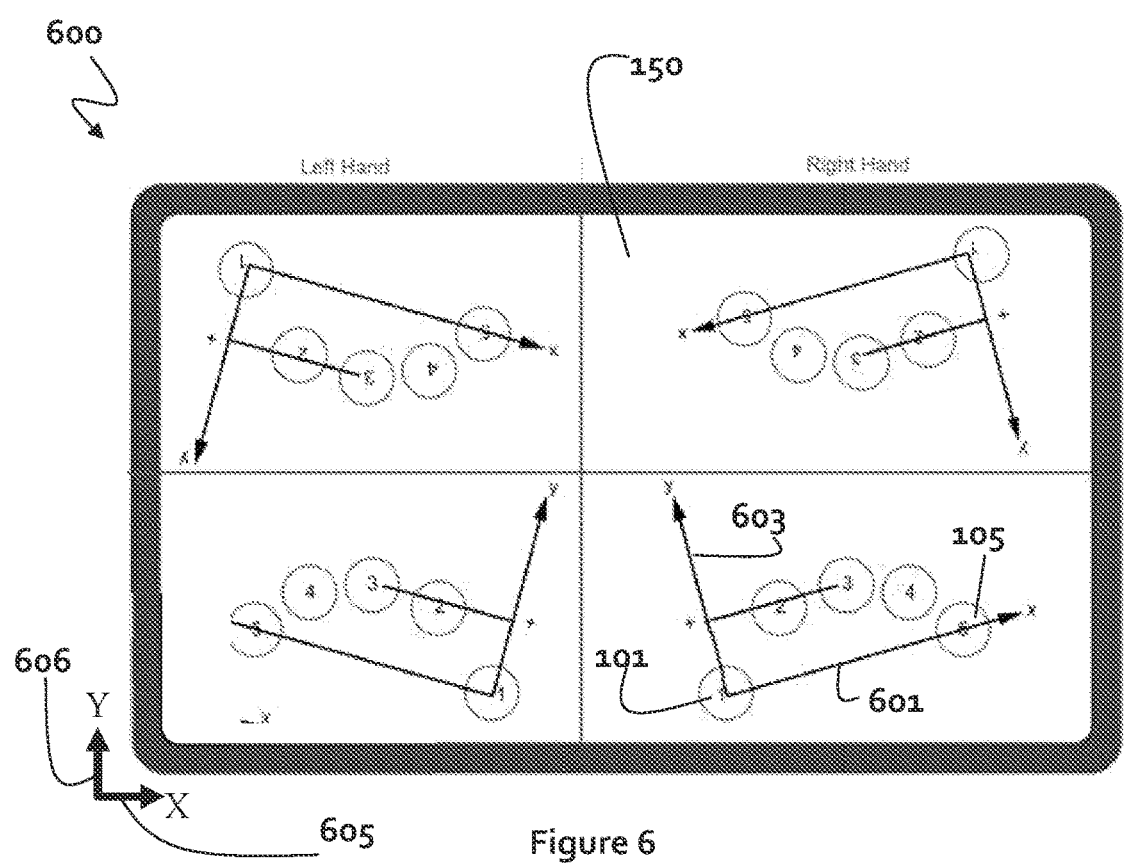
FIG. 6 shows 4 scenarios, when the user uses only one hand, to define if the user is left or right-handed, and if the hardware device is used in its normal orientation or upside down (i.e. the text would be displayed upside down for the user)

To operate the keyboard, the touch-sensitive interface 150 needs to detect:

1) The position of each of the user's fingers with respect to the touch-sensitive interface 150. Accordingly, the touch-sensitive interface 150 is generally required to be a multi-touch sensitive interface capable of registering at least 5 unique and/or simultaneous user touches on the interface 150;
2) Whether the user has placed their left hand or right hand on the touch-sensitive interface (e.g. see right-handed orientation 100 in FIG. 1B and left-handed orientation 200 in FIG. 2; and
3) The orientation of the hand with respect to the orientation of the touch-sensitive interface 150, see for example multiple possible orientations for a right-handed interface depicted in FIG. 6.

Generally, the user's hand does not need to be aligned with respect to a particular axis of the touch-sensitive interface 150. For example, in preferred arrangements, two or more users would be able to take turns to type on a device e.g. if they are sitting opposite to each other, without having to rotate the touch-sensitive interface 150.

Figure 3:
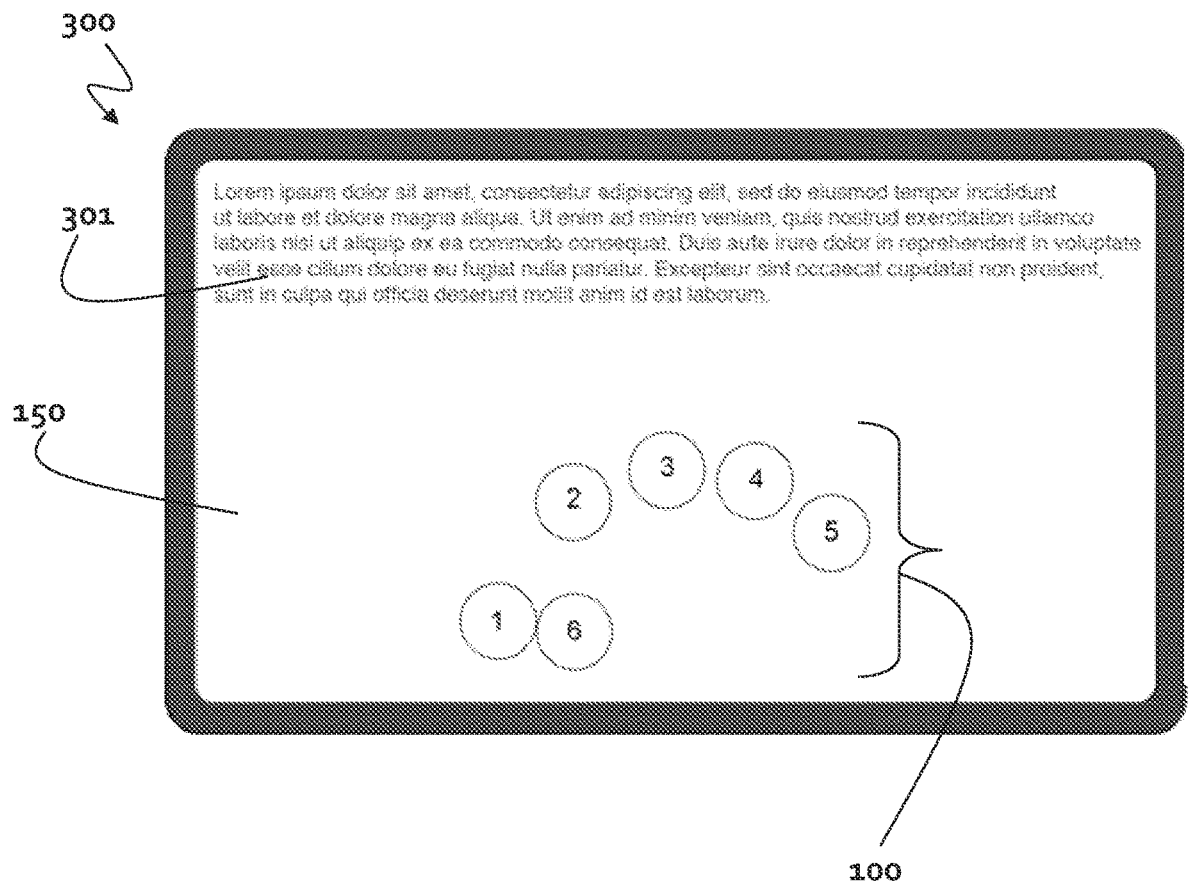
FIG. 3 shows the virtual keyboard corresponding to an input command interface without optional extension input locations overlaid on a Note taking application when the user is ready to type.

A simple notepad application implemented on a mobile computing device comprising a touch-sensitive display interface 150 is shown in FIG. 3. The interface 100 is advantageously superimposed on the touch-sensitive display interface 150 over the display (i.e. in this example, the inputted text 301). In particular arrangement, all application menus can be replaced by keyboard shortcuts which can advantageously be associated with input gestures (taps, swipes, pinches etc.) provided to the interface 100. The input command interface 100 detects the gesture made by the user and translates it into an input character key by comparing the user's gesture with the active keys' gestures. Character keys can correspond to, but are not limited to, one or more of:

A simple character, in which case the character is added to the text field that stores the note.

A keyboard shortcut that can, for example, be associated with input commands to make the text bold, or to create a table.

A Quick Text, wherein a predefined combination of characters or phrase, is sent to the text field that stores the note.

A control character, for example the Delete key.

A command, that can for example email the note, or activate the camera to take a picture and add it into the note.

Hand Recognition Procedure

Figure 5A:
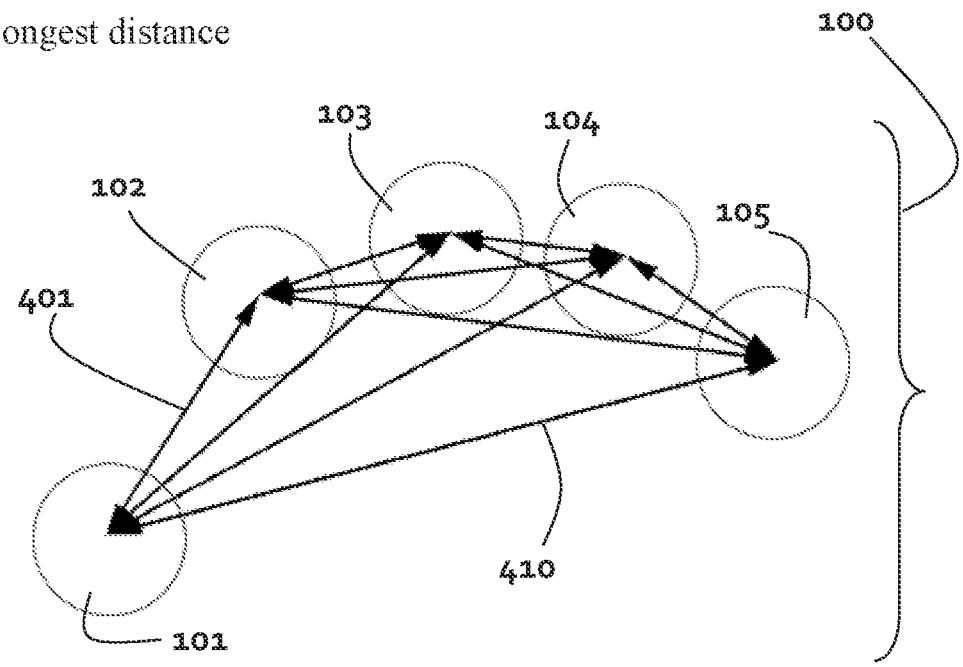
FIGS. 5A to 5C show the 3 steps of the hand recognition process to identify the finger numbers.
Figure 5B:
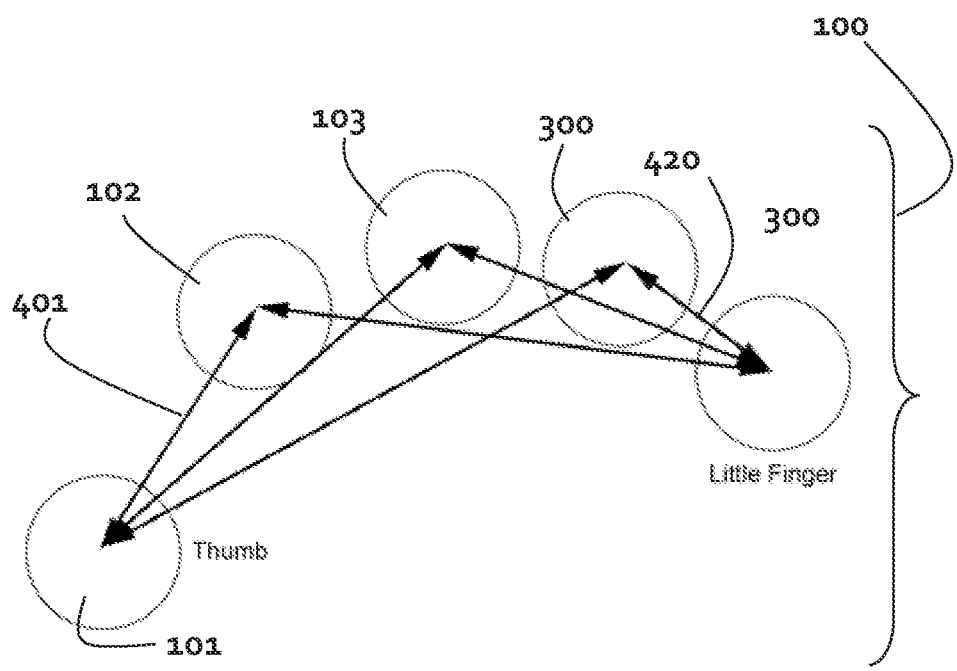
Figure 5C:
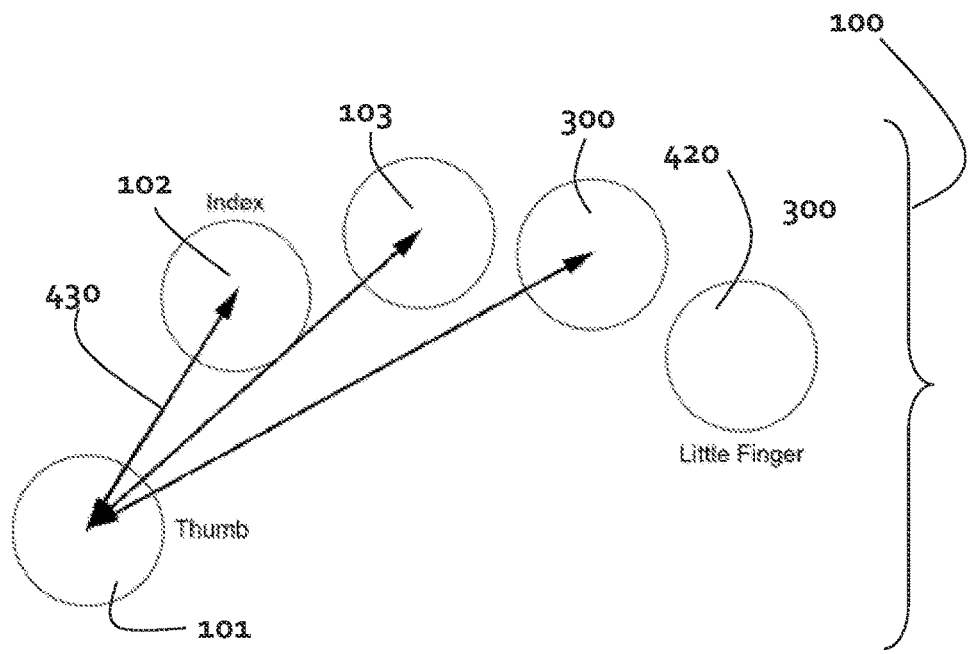

The hand recognition process is triggered when the users places their 5 fingers on the device (see FIGS. 5A to 5C).

The touch-sensitive interface 150 sends the coordinates of the five touched points, e.g. points 101, 102, 103, 104, 105, to one or more processors 402 of the computing device. In Step 1 as depicted in FIG. 5A, when the processor 402 receives the coordinates of the finger locations 101 to 105, the distance 401 is calculated between each of these finger locations. The longest distance 410 provides the index of the two most distantly spaced points, one of which, either location 101 or 105, is identified as the user's thumb. In Step 2 as depicted in FIG. 5B, to find out which location is associated with the user's thumb, the distance 410 between those points 101 and 105 and each of the other points 102, 103 and 104 is calculated. Out of those 2 points, the location that is closest to any other point (in this case, distance 420 between location 105 and location 104 is smaller than distance 401 between location 101 and location 102). Therefore, in this instance, location 105 is assumed not to be the thumb. The other one (location 101) is thus assumed to be the thumb. In Step 3 as depicted in FIG. 5C, each of the other fingers is then assigned by looking at the closest distance between a known finger and the remaining points. Each time a finger is found, its point is removed from the list. Starting from the thumb, we get: the closest remaining point, location 102 to the thumb is the index finger, the closest remaining point, location 103 to the index finger is the middle finger, and so on until all fingers are associated with a location. Once all fingers are assigned, the locations are respectively assigned as input locations of system 100.

Once the thumb is discovered, the orientation of the other fingers helps to calculate the orientation of the hand by placing the origin of a unique coordinate system at the location 101 associated with the thumb. In this coordinate system, the x-axis 601 is defined to extend from the origin (the thumb at location 101) to the little finger at location 105. The y-Axis positive direction 603 is defined such that the middle finger has a positive coordinate (see FIG. 6). By comparing the device orientation with the hand coordinate system, the orientation of the hand x-axis can be uniquely determined. When the hand x-axis is rotated to match the device X-axis (thick axis 605 in the bottom right corner of FIG. 6), it is concluded that:

If both y-axis 603 and Y-axis 606 are pointing in the same direction, the user is right-handed.

If both y-axis 603 and Y-axis 606 are pointing in opposite directions, the user is left-handed.

Motion Paths

Figure 7:
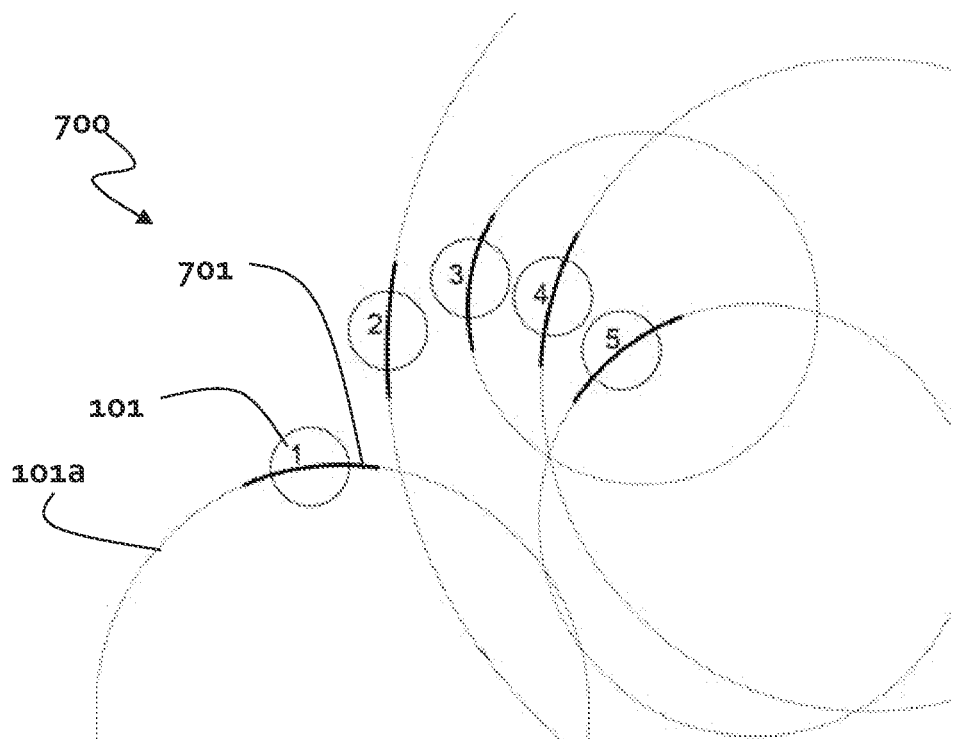
FIG. 7 shows the motion path of the user fingers during swipes and pinches.
Figure 9:
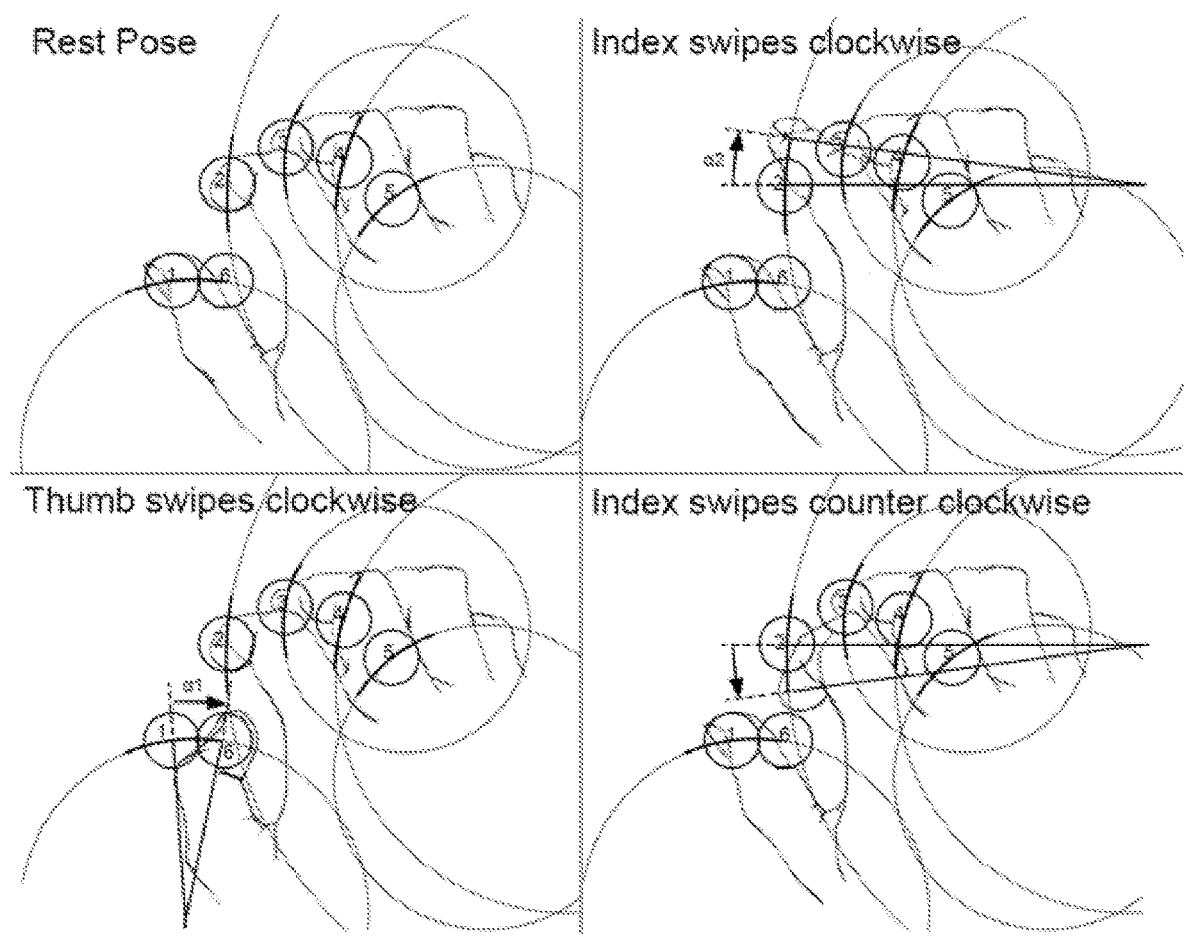
FIG. 9 shows how a swipe is detected from the hand initially in the rest pose when the required angle is reached on the finger's motion path.

When a hand is in a rest position (ready to type) on a flat surface, and if each finger is moved independently, instead of following a line, they are actually describing an arc on a circle (cf. FIGS. 7 and 9). The motion path of each finger has a different radius and a different centre point. By using the fingers' motion path rather than straight lines for gesture recognition, typing with the input command interface described in this invention is very natural for the hand. The thick portion of the line shown in each of the motion paths represents the minimum travel distance (the minimum arc angle 701 of FIG. 7) required for a finger to actually register a "swipe" or a "pinch" event as opposed to just a "tap" event. The application uses the path motion circles to determine whether a finger is moving clockwise or counter-clockwise.

The hand detection process described above also calculates:

The radius of the touch locations 101-105 using a predefined ratio based on the longest distance between fingers.

The centre and the radius of respective path circles (for example path circle 101a associated with thumb location 101, and other path circles associated with each of the user's remaining fingers as seen in FIG. 7) associated with the natural motion of each of the fingers' path using a location ratio based on the longest distance between fingers. For each finger, the standard position of the centre and the radius are factored by the location ratio.

The minimum motion arc angle (701 of FIG. 7) of a touch gesture required to validate a swipe or a pinch gesture that the fingers need to move to. The distance is generally defined as being the same for each finger, so that the motion arc angle change depending on the radius of the circle (i.e.: the angle gets smaller as the radius increases).

Figure 8:
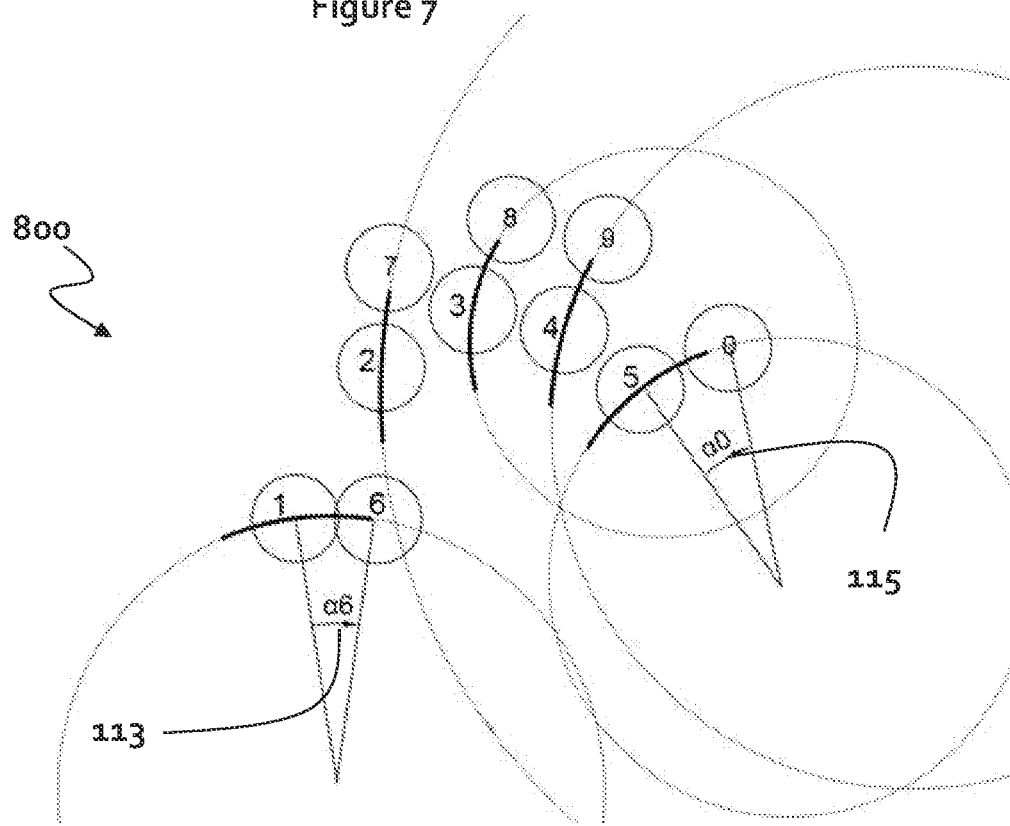
FIG. 8 show how circles from the fingers' motion path are used to calculate the additional and extended input locations.

The location of an additional (optional) Thumb touch location 6 (location 106) is calculated using the position on the path circle associated with the thumb by a pre-defined clockwise angle (113 of FIG. 8). The angle is proportional to the radius and the location ratio.

The location of the optional extended input locations Number 7, 8, 9, and 0 (locations 107, 108, 109 and 110 of FIG. 1) are calculated using the position on each path circle associated with respective ones or each of locations 101 to 105 at a pre-defined clockwise angle (115 of FIG. 8) of their respective fingers. The angles 113 and 115 are proportional to the radius of the associated path circles and the location ratio.

The input locations 6, 7, 8, 9 and 0 (locations 106 and 107 to 110) are optional as they are not necessary for reproduction of all the keys on a standard physical hardware keyboard device. Their usage could also be difficult on a small interface 150 device such as that of a smartphone device. However, on a larger touch device like a tablet computer or a larger Touchpad, they could provide for an enlarged character set and/or significant shortcuts for input commands such as textural input or keyboard shortcut commands.

Although the above orientation and input location designation process is effective at detecting the user's hand position and motion paths of each of the user's fingers, a manual input location designation process can optionally be implemented. Such a manual designation process may provide further advantages in optimizing the input location areas and fingers' motion paths based on the user's specific hand, which could also include people with missing fingers.

Keys and Gestures

To be able to gain maximum performance while using the keyboard, a specific gesture system has been developed based on the fingers' motion path. The possible gestures are taps, swipes and pinches. A gesture must be initiated within an input location. The diameter of the input location is calculated based on the size of the hand. A smaller hand will have smaller input locations closer to each other, while a larger hand will have larger input locations further apart from each other.

The tap is detected when the user touches the device in one of the primary, additional or extended input locations. Taps can be done with one or several fingers at the same time.

When the fingers are extended or contracted in a input location, the motion path can be assimilated to a circle specific to each finger (see FIG. 7).

A swipe is detected when the minimum required motion arc angle (see 701 of FIG. 7) is reached between the starting point, the end point and the centre of the circle (See FIG. 8), along the finger's motion path and without lifting the finger. The swipe gesture can be detected as either Clockwise (notated C) or Counter-Clockwise (noted K) depending on the angle reached. The gesture can also be a double swipe: swipe Clockwise immediately followed by a swipe Counter-Clockwise (notated CK) without lifting the finger up, or vice-versa (noted KC). Swipe gestures can also be done using several fingers at the same time.

Figure 10A:
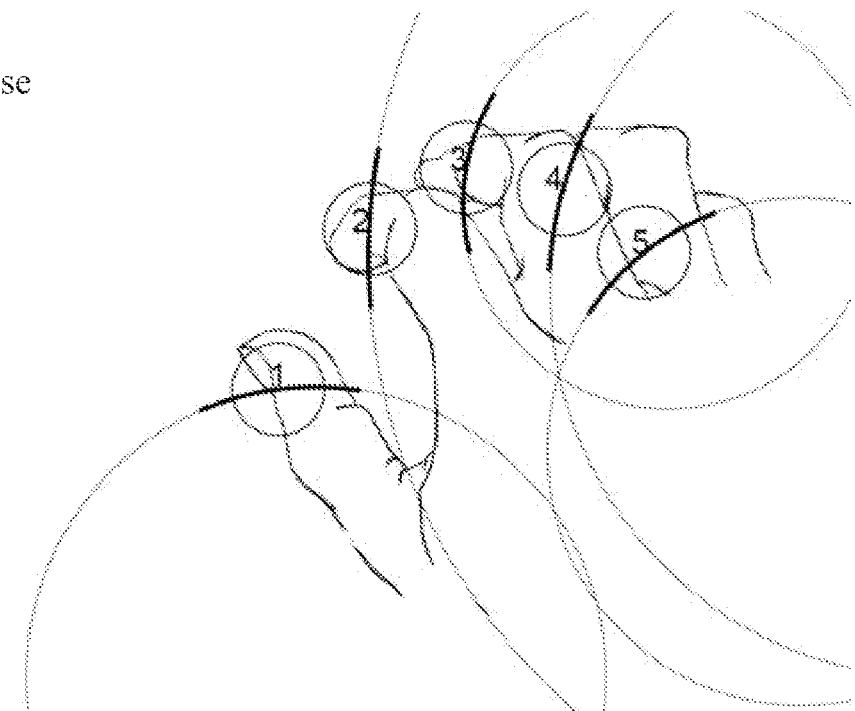
FIGS. 10A and 10B shows how a pinch is detected when the required angle is reached for the thumb and one or more other fingers on the fingers' motion path.
Figure 10B:
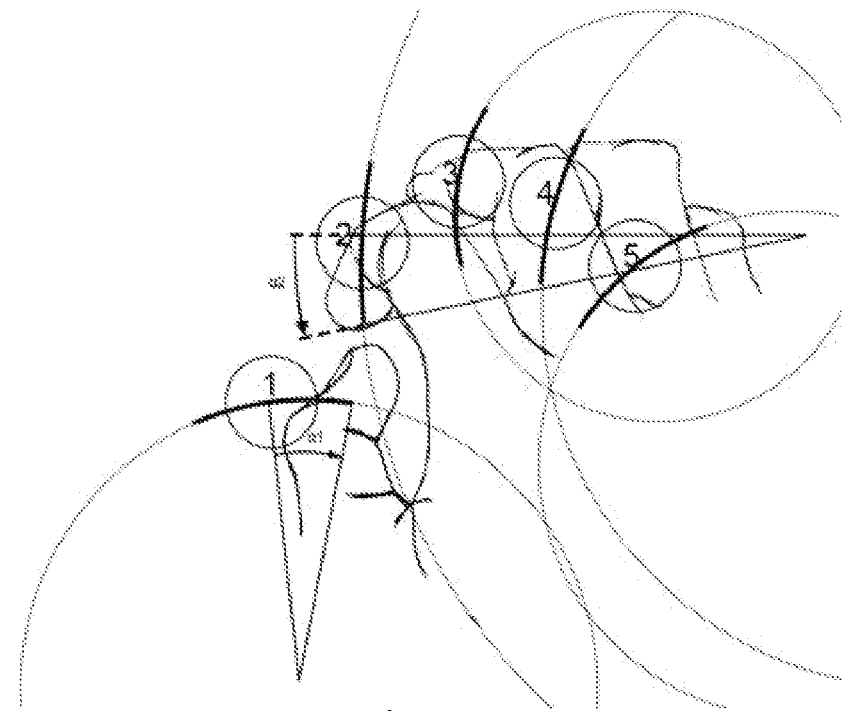

A Pinch is detected when the thumb and one or more other fingers are detected during a swipe gesture. The Pinch can be either IN or OUT, depending if the fingers are respectively contracting (See FIGS. 10A and 10B) from the Rest Pose (FIG. 10A) or stretching following each finger's natural motion path. A pinch IN is typically defined as being when the Thumb is moving Clockwise and any other fingers are moving Counter-Clockwise. A pinch OUT is typically defined as being when the Thumb is moving Counter-Clockwise and any one or more of the other fingers are moving Clockwise. The gesture can also be a double pinch: pinch IN immediately followed by a pinch OUT (notated IO without lifting the fingers up from the touch-sensitive interface 150, or vice-versa (notated OI).

Traditionally a pinch happens when fingers are moving directly towards each other. However this particular motion is not conducive to fast typing because it forces the hand to move more and to become tense as the fingers must move outside of their natural motion paths. The thumb would technically need to move at least towards 4 different directions, towards each one of the other fingers. Using a pinch that uses the circle of motion is significantly more natural and efficient because it keeps the fingers only along their own individual natural paths. It also doesn't require moving the wrist sideways and/or up and down, which occurs during a traditional (straight-line) pinch. When the wrist moves it may not come back to its original position, which can lead to fingers missing their input locations for subsequent gestures.

The flowchart in FIG. 11 depicts a method 1100 showing the method of processing the Touch events received by the touch-sensitive interface 150 and processed by processors 402 of the computing device 400. The analysis of the gestures is used to produce a final combination which is associated with an input signal corresponding to, for example a character input or modifier key input. The touch event sequence is split into 3 phases:

Touches Begin 1110: Input locations that are touched by a user's finger are tracked, and the initial gesture is set to "TAP". (A 'Touches Begin' event can potentially happen while another finger is already moving.)

Touches Moved 1120 (Optional): The coordinates of the touched input locations are converted into the hand coordinate system (see FIG. 6). The arc angle through which the user has 'swiped' their finger, can then be calculated between the [initial] touched input location(s), the centre of the circle of motion, and the current touched input location. If the absolute value of the angle reaches the minimum required motion arc angle (see 113, 115 of FIG. 8, and FIG. 9 showing examples of swipe gestures), the gesture is identified as a "SWIPE". If the angle is in a pre-defined positive direction along the path circle associated with the input location, the direction of the gesture is marked as "Clockwise", otherwise it is marked as "Counter-Clockwise"

Touches Ended 1130: If the thumb input location was in the list of multiple input locations that were simultaneously tracked AND if the gesture was set to "SWIPE" (notated as "S") then the gesture is changed to "PINCH" and the direction is changed accordingly to "IN" or "OUT" based on the direction of the thumb and the other fingers. The final combination is built based on the Gesture, the list of input locations that were tracked and the relative Direction (e.g clockwise or counter-clockwise) to form a gesture. An example gesture may be annotated as S345.0 corresponding to a swipe gesture incorporating 3 fingers (from input locations 3, 4, & 5) in a clockwise direction (i.e. a swipe gestures involving 3 fingers only).

Real Time Adjustment of Input Locations

Figure 12A:
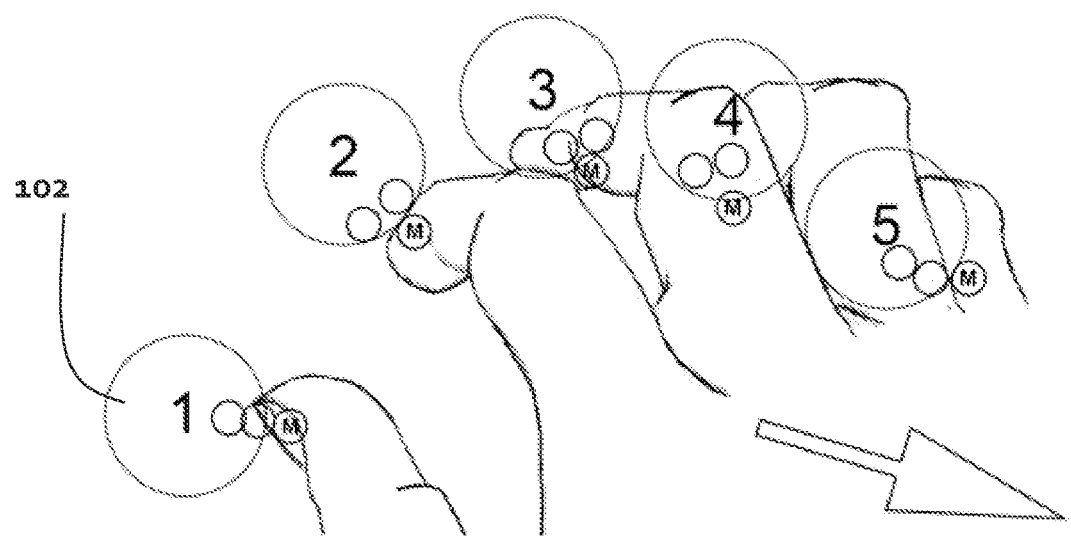
FIG. 12A shows fingers drifting from their original position and missing their target—i.e. target locations 102 etc. The application advantageously constantly re-adjusts the input location coordinates detected during the initial hand recognition process.

As the user types, the fingers are likely to drift, contract or stretch (See FIG. 12A). The wrist will likely drift as well. The system needs to constantly re-adjust the input locations automatically otherwise the user will soon start missing input locations (marked with an M on the figure) and the keys that the user was expecting to type are not going to be processed.

Figure 11A:
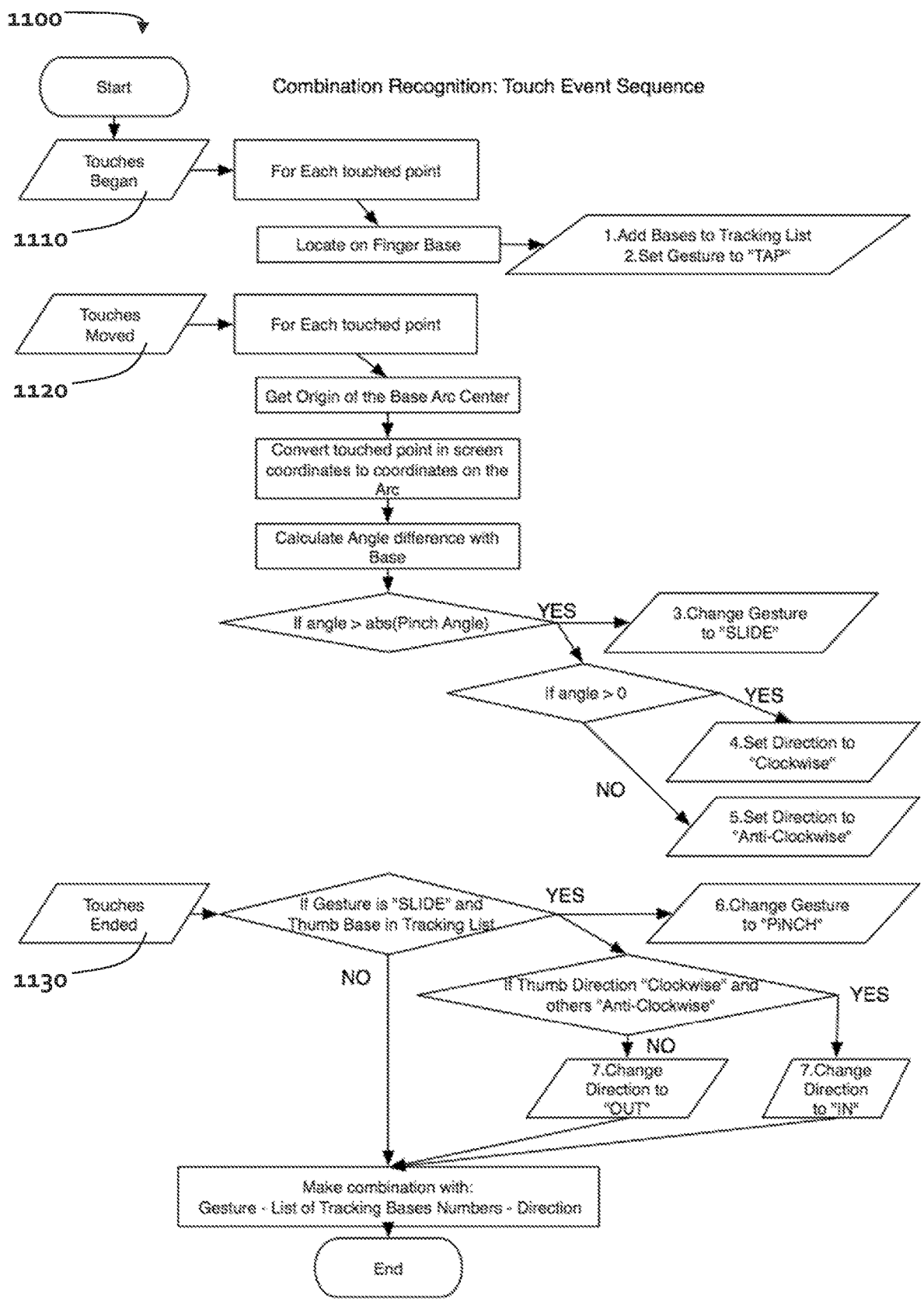
FIG. 11A is a flowchart of method 1100 that illustrates how a combination is assembled when the user performs a gesture on the input command interface.
Figure 11B:
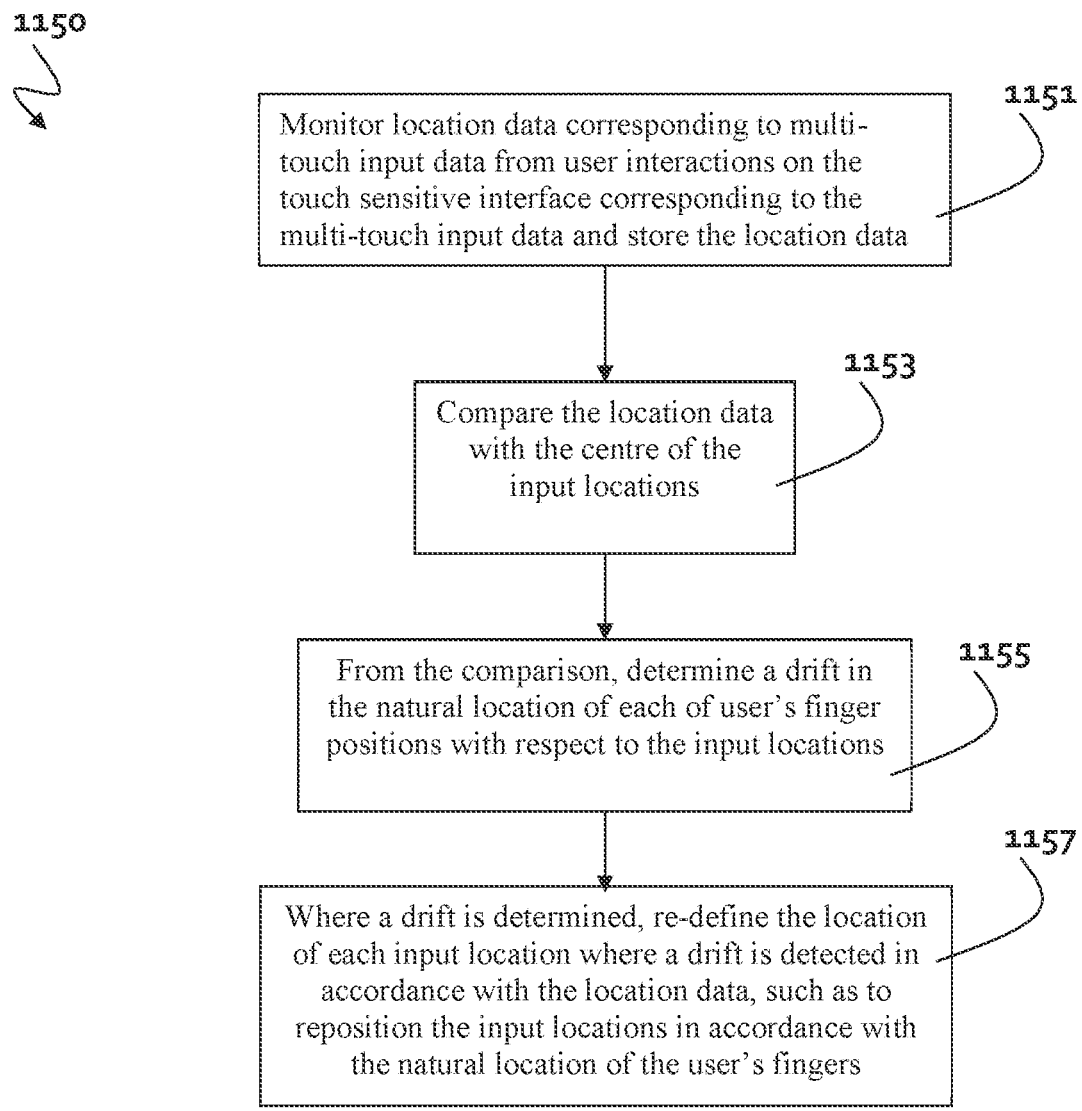
FIG. 11B is a flowchart of method 1150 that illustrates the real-time monitoring of user taps and other integrations with the touch-sensitive surface and re-defining of the input locations to match the current position of the user's fingers with respect to the interface.

FIG. 11B depicts a method 1150 adapted to correct for the drift in the users wrist and fingers. Method 1150 comprises the step of monitoring 1151 location data corresponding to multi-touch input data from user interactions on the touch sensitive interface corresponding to the multi-touch input data and store the location data in memory. Method 1150 further comprises the step of comparing 1153 the location data with the centre of the input locations. Method 1150 further comprises the step of, from the comparison, determining 1155 a drift in the natural location of each of user's finger positions with respect to the input locations. Method 1150 further comprises the step of, where a drift is determined, re-define 1157 the location of each input location where a drift is detected in accordance with the location data, such as to reposition the input locations in accordance with the natural location of the user's fingers.

Figure 12B:
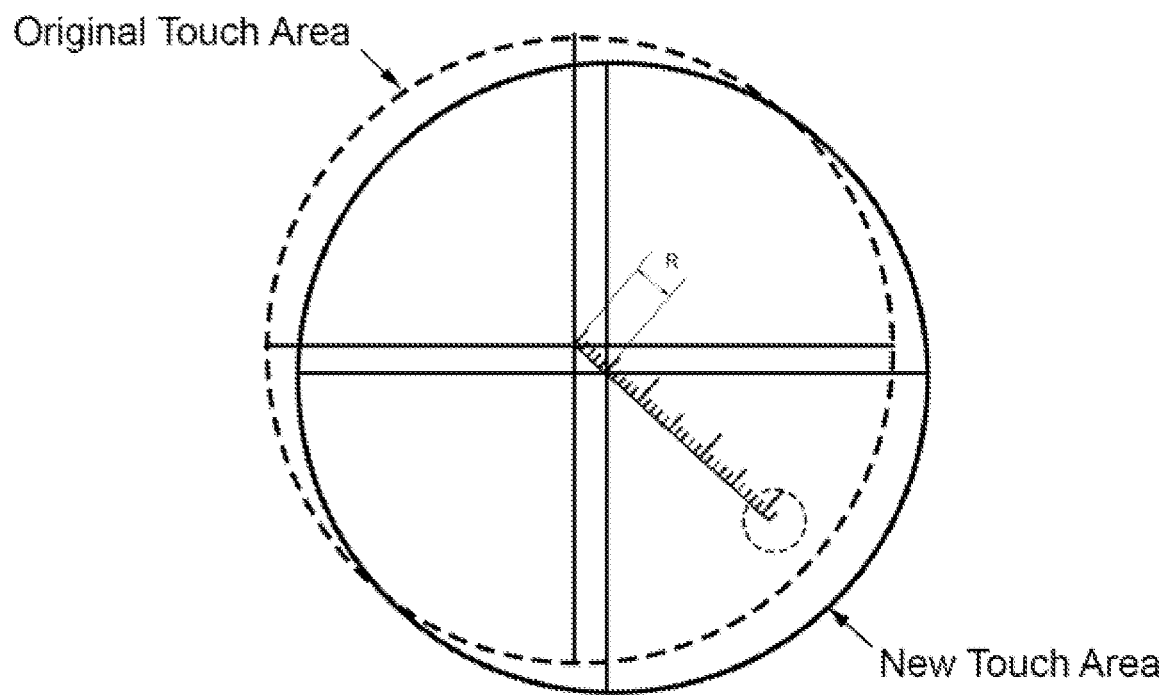
FIG. 12B shows the recalculation of the input location due to drift of the user's fingers from the current input location.

The system re-adjusts the origin of each input location in real-time or near-real-time by continually comparing the centre of each input location with the user's most recent or current touch location. A pre-defined ratio is applied to move the input location's centre towards the latest touched location (See FIG. 12B).

If the user performs a swipe gesture, the circular motion of the finger allows the system to re-calculate the centre and radius of the circular path for the most recent or current detected touch motion. The motion circle associated with each of the user's fingers is thus continually re-adjusted by using a pre-defined ratio between the current circle origin and radius, and the latest circle origin and radius.

Those adjustments are particularly advantageous in order to keep an accurate reading of gestures after a period of time.

Gesture Combinations

Gestures are used to trigger keys or commands, and below is a list of possible combinations. The list is not exhaustive, for example we could add double taps, continuous swipe Clockwise to counter-clockwise CK (or vice-versa), continuous pinch in and out IO (or vice-versa). However, in order to keep the complexity as low as possible for the users, the following set is a realistic set than can be used by most users:

The following convention is used:
Primary Touch Locations:
Thumb 101: 1
Index 102: 2
Middle Finger 103: 3
Ring Finger 104: 4
Little Finger 105: 5
Inner Thumb 106: 6
Extended Touch Locations:
Extended Index 107: 7
Extended Middle Finger 108: 8
Extended Ring Finger 109: 9
Extended Little Finger 110: 0
T for Taps
S for Swipes (Clockwise: C, or Counter-Clockwise: K)
P for Pinch (In: I, or Out: O)
Example Notated Gestures:
T12 means: Tap both Finger 1 (Thumb) and Finger 2 (Index) simultaneously;
S34.K means: Swipe both Finger 3 (Middle) and 4 (Ring) counter-clockwise simultaneously;
P15.I means: Pinch In both Finger 1 (Thumb) and 5 (Little), towards each other.

Listed below is a non-exhaustive list of 108 possible combinations plus an additional 13 Extended Combinations:
Taps (46 Combinations+13 Extended Combinations):
T1, T2, T3, T4, T5, T6; {one finger taps}
T12, T13, T14, T15, T23, T24, T25, T34, T35, T45; {two finger taps}
T123, T234, T345, T124, T125, T134, T135, T145, T235, T245; {three finger taps}
T1234, T2345, T1235, T1245, T1345; {four finger taps}
T12345, {five finger tap}
T62, T63, T64, T65,
T623, T624, T625, T634, T635, T645,
T6234, T6235, T6245, T6345
Extended:
T7, T8, T9, T0,
T78, T89, T90,
T79, T70, T80,
T789, T890,
T7890,
Swipes (32 Combinations):
S1.C, S2.C, S3.C, S4.C, S5.C,
S1.K, S2.K, S3.K, S4.K, S5.K,
S23.C, S34.C, S45.C,
S23.K, S34.K, S45.K,
S24.C, S25.C, S35.0
S24.K, S25.K, S35.K
S234.C, S345.C, S234.K, S345.K,
S235.C, S245.C, S235.K, S245.K,
S2345.C, S2345.K
Pinches (30 Combinations):
P12.I, P13.I, P14.I, P15.I,
P12.O, P13.O, P14.O, P15.O,
P123.I, P134.I, P145.I, P124.I, P125.I, P135.I,
P123.O, P134.O, P145.O, P124.O, P125.O, P135.O,
P1234.I, P1345.I, P1245.I, P1235.I,
P1234.O, P1345.O, P1245.O, P1235.O,
P12345.I, P12345.O Combinations can be combined together as well. For example, to map the Functions keys (F1-F12) on a standard physical keyboard, we can use the combination used for the Function key followed by the combination used for the number key. Instead of using 12 combinations for the Function keys, only one additional one is created. It will then be designated as T34+T1 for F1, or T34+T2 for F2, etc.

Memory Banks

Each required gesture combination is stored in a memory bank which associates each gesture with a character or input command. To extend the initial set of combinations further, multiple memory banks can also be provided.

Figure 13:
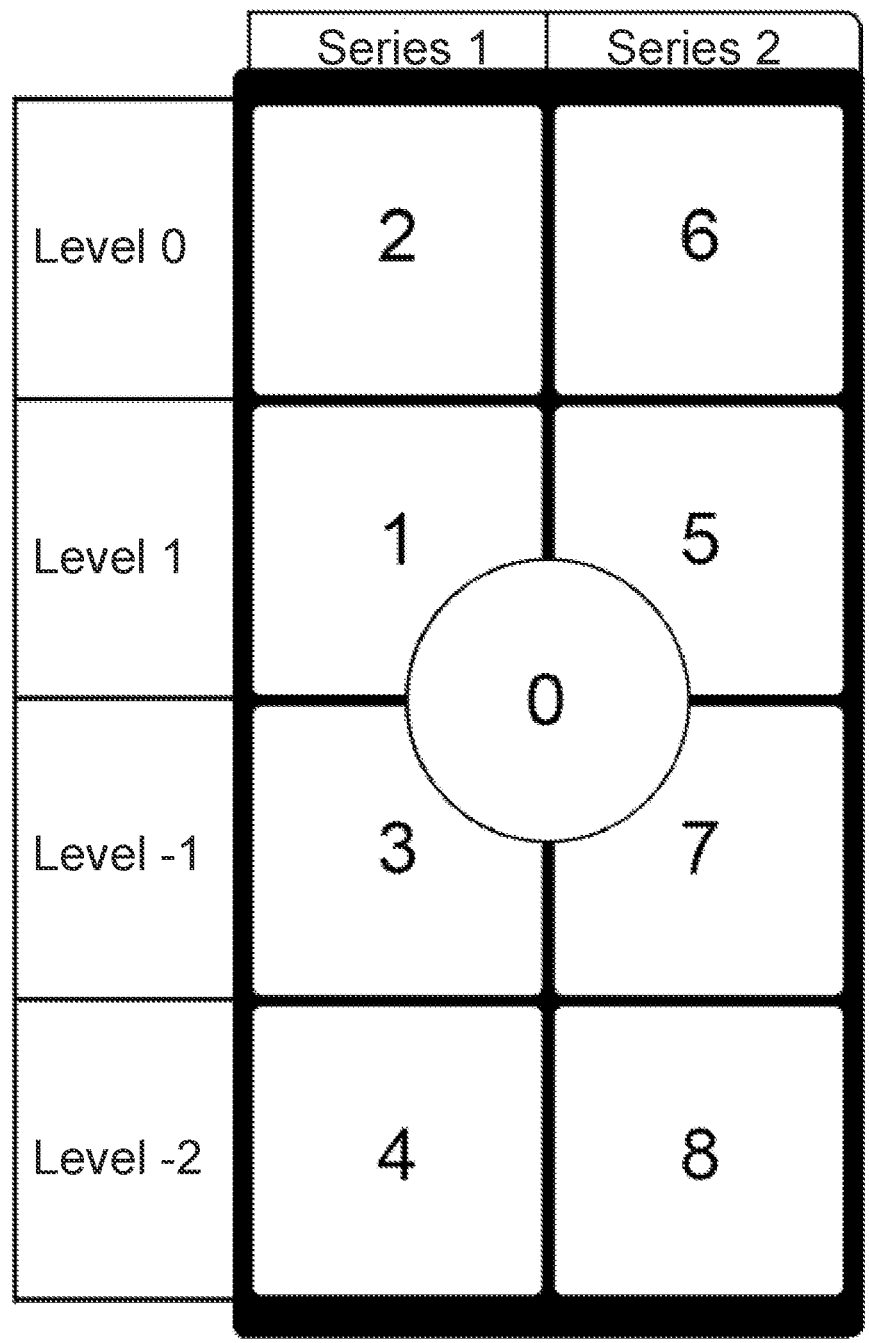
FIG. 13 shows the memory bank system used to expand the number of possible keys while limiting the number of complex combinations.
Figure 16:
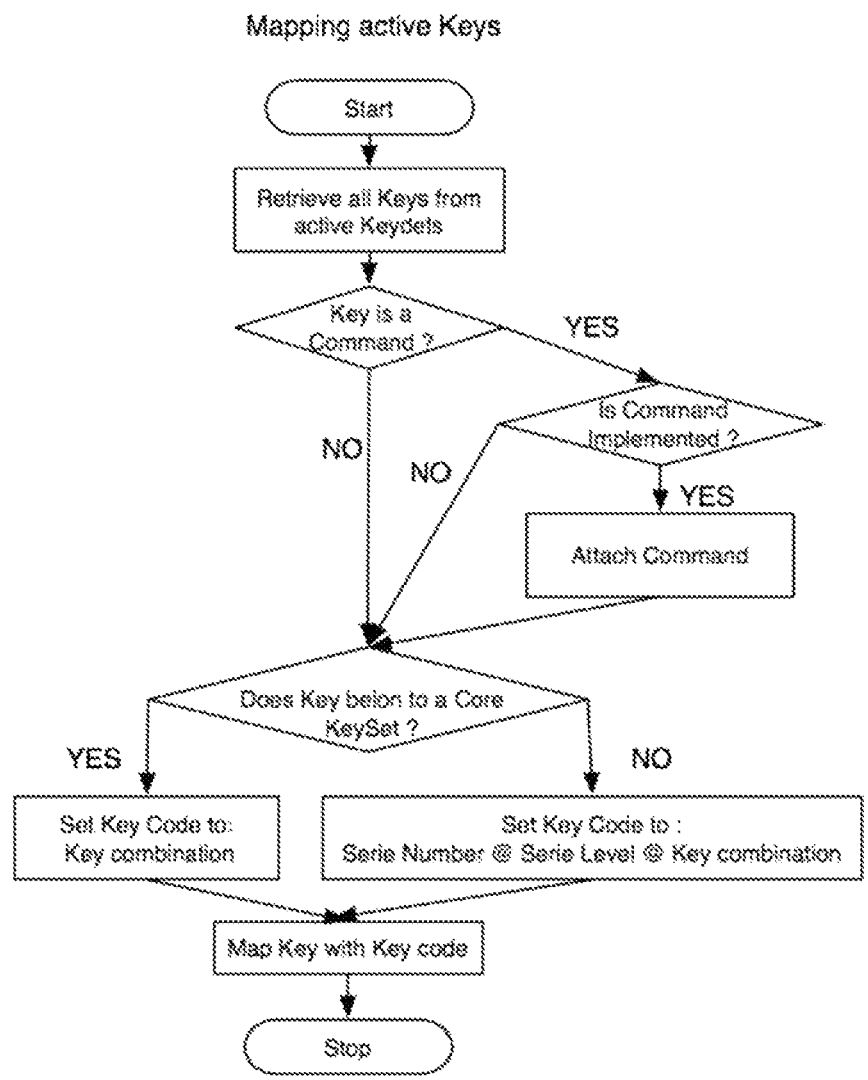
FIG. 16 is a flowchart of method 1600 that illustrates how the active Keys and their optional commands are mapped. This mapping is used to provide a fast way to convert a combination into a Key.
Figure 17:
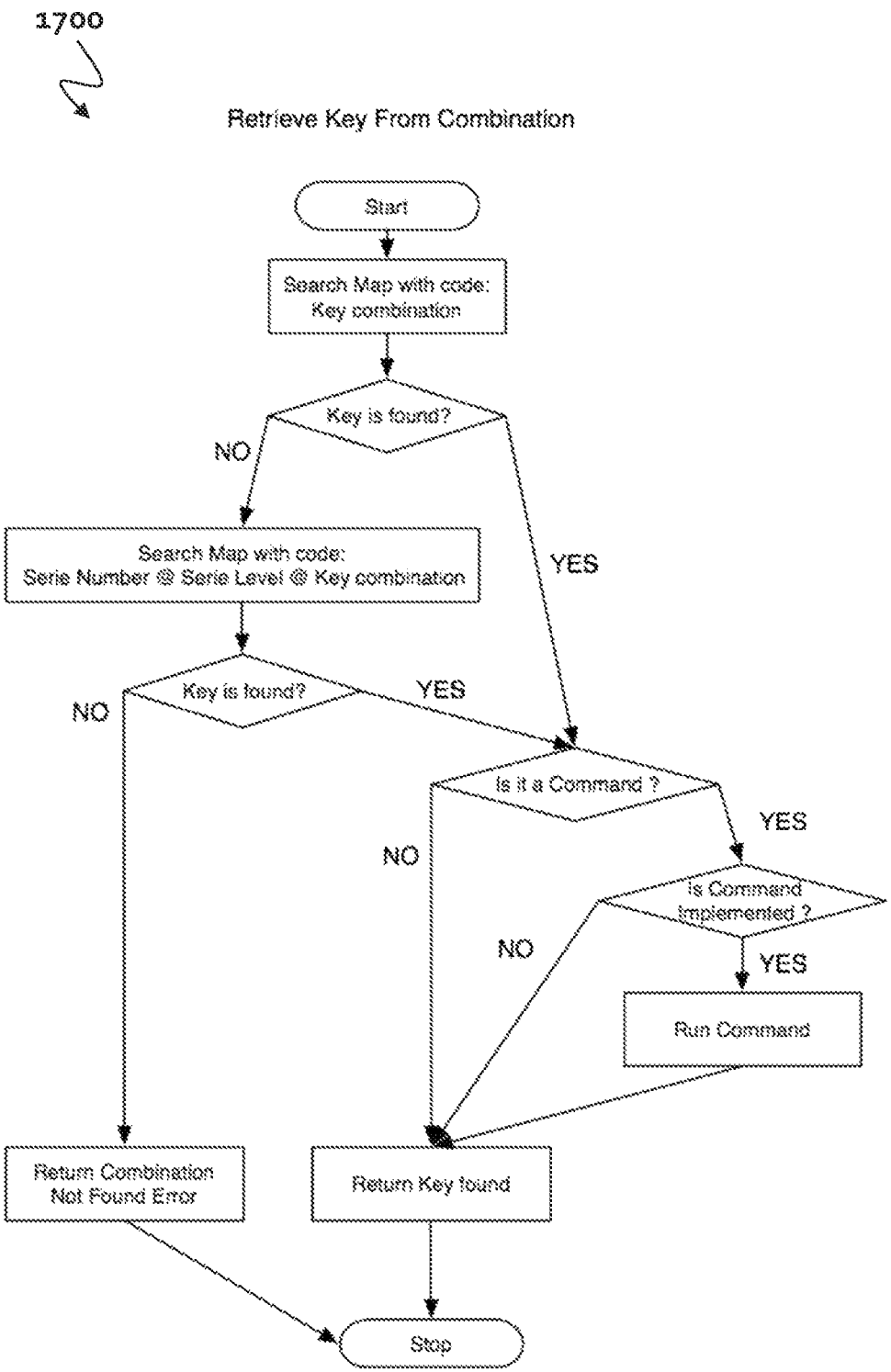
FIG. 17 is a flowchart of method 1700 that illustrates how the system processes a combination and returns the Key it is associated to, using the mapping of FIG. 15. If the Key is attached to a command and if the command is implemented by the system, this command will also be run.

FIG. 13 shows a realistic set of 9 memory banks and how they can be visualised. By using those memory banks we can increase the number of combinations 9 times. For example if we apply this multiplication to the non-exhaustive list of 108 possible combinations to obtain 108×9=972 possible gesture combinations.

To provide a quick gesture access to the multiple memory banks, they are organized into Series and Levels. The central circle is the default bank and has a Series number of 0, and a level number of 0.

Each Series in the present arrangement is split into Levels. The level number can be either positive or negative with respect to the default bank. An example of gesture management to navigate the various series and levels could be as follows: for one particular series, a gesture combination is used to select positive levels, while another is used to select negative levels. Hence, for one series, changing memory bank levels is never more than two keys away (1, 2) or (−1, −2), if the system uses 4 levels.

If the system has 2 possible series and 4 possible levels, the list of 9 possible memory banks as depicted in *Figure is as follows:

Bank 0: Series 0, Level 0 (default, central circle)
Bank 1: Series 1, Level 1
Bank 2: Series 1, Level 2
Bank 3: Series 1, Level −1
Bank 4: Series 1, Level −2
Bank 5: Series 2, Level 1
Bank 6: Series 2, Level 2
Bank 7: Series 2, Level −1
Bank 8: Series 2, Level −2

The possible combinations to navigate through the 9 memory banks requires at least 5 gesture combinations:

1 gesture combination to go down the levels of Series 1
1 gesture combination to go up the levels of Series 1
1 gesture combination to go down the levels of Series 2
1 gesture combination to go up the levels of Series 2
1 gesture combination to go back to the default memory bank 0.

When a gesture combination has been processed, the system can either switch back to the default bank automatically, or stay in the alternate memory bank (Bank 2, Bank 3, etc.), depending on the memory bank settings. For example, if a memory bank contains rarely used symbols or functions then it can be configured to automatically return to the default memory bank after use. However, if a memory bank contains numbers, the user will have to switch manually back to the default memory bank.

There is no limitation to the number of possible levels and series.

Keys

A Key is defined by a gesture combination (i.e. T4) being used to process one or more characters, symbols or functions. For example, a key (input location or gesture combination) can be used for the letter "A", while another can be used for the quick text "Kind Regards,". Keys are also used for all the non-graphical characters, such as modifier characters for example the "Control", "Shift", "Alt", "ESC", etc. keys normally found on a physical keyboard. Keys can also be used for keyboard shortcuts, or any other function implemented by the software application. For example: "Send Email", "Create Table", "Select Drawing Tool", etc.

Keys are also organized in Groups (Letter, Number, Punctuation, Function, Accent, Quick Text, Emoticon, etc.) and in Ranks (1, 2, 3, 4, 5, etc.) for training purposes. When the user learns the combinations, it is easier to learn the Keys from the Group "Letters" in Rank 1 first, then learn the Keys from the Group "Letters" in Rank 2, then the Keys from the Group "Letters" in Rank 3, etc. A smaller Rank number indicates:

The gesture is easier to perform
The Key or Command that it is attached to is used more frequently.

For example a Tap with a single finger (Rank 1) is easier to perform than a Tap with 3 fingers (Rank 6). In the English language, a tap with a single finger should be used for the letter "e" (the most frequent), while a tap with 3 fingers should be used for the letter "z" (the less frequent). But it can be completely different for another Language and should then be adjusted accordingly.

Keys are stored in a specific memory bank. A particular combination can be associated to several Keys that are stored in different memory banks. For example:

T2 in the memory bank 0 can be associated to "e"
T2 in the memory bank 3 can be associated to "2"

To summarize, Keys may be defined by:

A combination (ex: T4, or S23.K)
A content (ex: the letter "a", or the function "Send Mail")
A group (ex: Letter)
A rank (ex: Rank 1)
A memory bank series (ex: Series 0)
A memory bank level (ex: Level 0)

Keysets

Keys are advantageously grouped into Keysets. A Keyset can contain one to many Keys.

Keysets can be active or inactive. When a Keyset is active, the combinations stored in the Keys are active and the Keys' gesture will be processed by the application. When a Keyset is inactive the gestures associated to the Keys are ignored.

Keysets are advantageously used for example for the reason below:

To organize Keys into a logical grouping. For example: Core, Latin, Quick Text, Functions, etc.
To organize Keys into different character set. For example: Latin, Greek, Japanese, etc.
To group localized Keys together. For example: a French Keyset, which contains all the diacritics and special characters needed, can be used in conjunction with the Latin Keyset.
To allow users to create or download Keysets that have been arranged for specific purposes (for example mathematical symbols).
To group Keys in an application for shortcuts, functions, etc.

A Keyset can be defined as a "Core" Keyset. In a Core Keyset the Keys or Commands are reserved in every Memory Bank without needing to redefine them. For example: if a Key is defined as being the "ENTER" key and if it is stored in the "Core" Keyset, then, when the user switches to a different Memory Bank, the combination used for the "ENTER" key will work in that Memory Bank too. This means that the combinations from Keys stored in the "Core" Keyset cannot be redefined for something else in a different Memory Bank.

Hence, each Key stored in the Core Keyset reduces the total number of possible combinations, as they can't be re-used. For example: if 5 Keys are stored in the "Core" Keyset and the software application uses 9 series and the number of combinations is 108, then the first series will still have 108 combinations, but the other 8 will have 108−5=103 available combinations. Instead of the initial 972 possible combinations, the new total is 108+8*103=932 combinations.

If a user wants to switch from a Latin Keyset to Greek Keyset, the Latin Keyset needs to be inactivated, while the Greek Keyset needs to be activated. This could be achieved using a single gesture by using a Key combination programmed to that effect.

Keysets may be defined by:
A name,
A description,
A list of Keys,
An activation switch Keysets and Keys Configuration The software application can offer the user an interface to customize his/her own Keys and Keysets as shown on FIGS.

Figure 14:
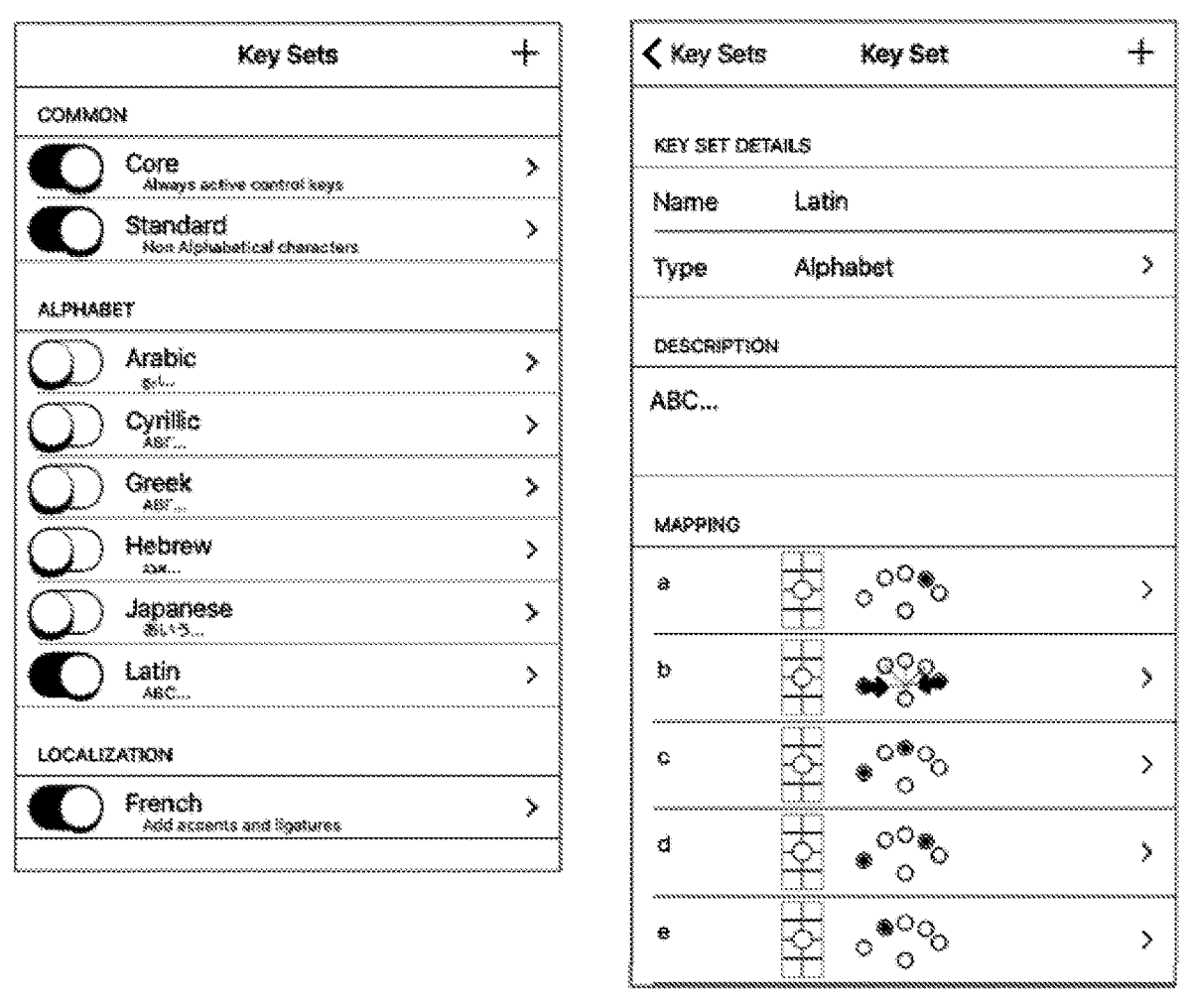
Figure 15:
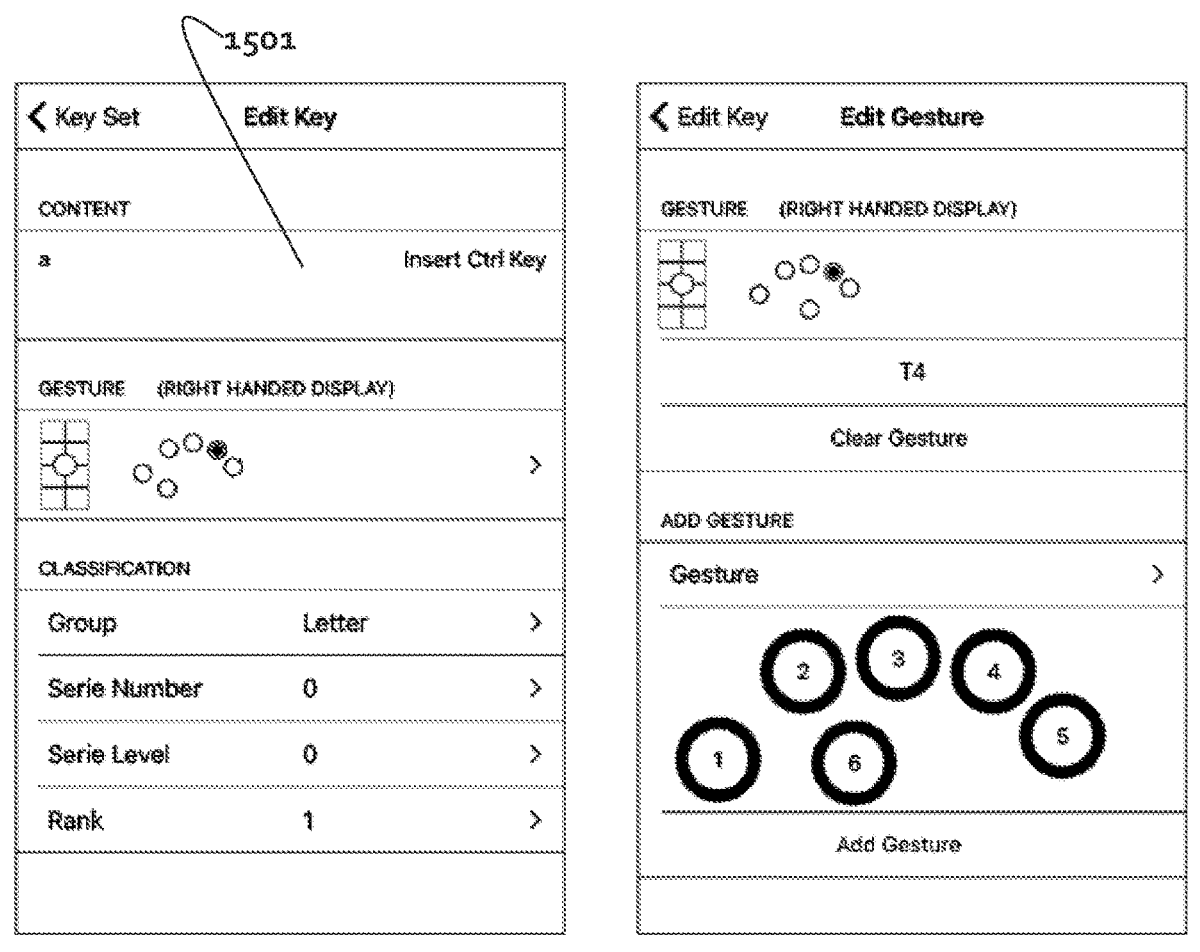

14 and 15. FIG. 14 shows how the user can activate/deactivate the Keysets and also control the mapping of each associated Keys. FIG. 15 shows the details of a Key in the selected Keyset, and let the user edit its associated gesture.

The group and rank are used for training purposes. The training module can create several lessons to learn all the Keys in the group "Letters". The rank is used to sort the Keys by difficulty (in terms of gesture or usage) within the same group, which allows learning Keys by small group of 4 or 5. For example the Rank 1 for the Group "Letters" contains the letter E, T, A and O which are the most used characters in English, and they will be in the first lesson for an English speaking user.

Although the system will provide a default configuration based on the user's localization settings, the user will be able to create or download his/her own Keysets and Key combinations according to his/her needs.

The software application using the input interface should also provide a Keyset with the list of commands that are available (for example: Send Mail, Change text to bold, take a Picture, etc.). Those commands can be made accessible in the Content section 1501 of the Key configuration (FIG. 15), enabling each available command to be mapped to a combination of the user's choice.

The content of a Key can also be a series of character to create a Quick Text (For example: "Kind Regards,").

The user's Keysets configuration can be stored on a server accessible over the Internet. The user's configuration then becomes available anywhere where the Internet is accessible, and on any device. This allows someone travelling on the other side of the world using someone else's device to have access to all their personalized Keysets, settings and preferences.

Mapping of a QWERTY Keyboard

To be able to gain maximum performance while using the input interface disclosed herein, the keys have been mapped to gestures according to their frequency in the English language and the easiness of the gesture. Depending on the language, the letters frequency changes. In preferred arrangements, the user is able to select the keyset of his choice by adopting either the standard gesture mapping below, or a keyset optimized for his language. Optionally, a user may be provided the ability to define their own customised gesture mappings.

|     |           |        | Series 0         | Series 1         |                  |
|-----|-----------|--------|------------------|------------------|------------------|
|     |           |        | Level 0          | Level-1          | Level-2          |
| TAP | 1 Finger  | T1     | [SPACE]          | 1                |                  |
|     |           | T2     | e                | 2                | •                |
|     |           | T3     | t                | 3                | ○                |
|     |           | T4     | a                | 4                | →                |
|     |           | T5     | o                | 5                | □                |
|     |           | T6     |                  | [SPACE]          |                  |
|     | 2 Fingers | T12    | l                | +                | X                |
|     |           | T13    | c                | *                | ✓                |
|     |           | T14    | d                | /                | □                |
|     |           | T15    | u                | \                | □                |
|     |           | T23    | m                | (                | ☺                |
|     |           | T24    |                  |                  | ☹                |
|     |           | T25    |                  |                  | ♥                |
|     |           | T34    | f                | [FUNCTION]       | ©                |
|     |           | T35    |                  |                  | ™                |
|     |           | T45    | p                | )                |                  |
|     |           | T62    |                  |                  |                  |
|     |           | T63    |                  |                  |                  |
|     |           | T64    |                  |                  |                  |
|     |           | T65    |                  |                  |                  |
|     | 3 Fingers | T123   | j                | [                |                  |
|     |           | T234   | q                | =                |                  |
|     |           | T345   | z                | ]                |                  |
|     |           | T124   | [SHIFT]          | {                |                  |
|     |           | T125   | [CAPS LOCK]      | }                |                  |
|     |           | T134   | —                | —                |                  |
|     |           | T135   | -                | -                |                  |
|     |           | T145   | ·                | ·                |                  |
|     |           | T235   | ~                | ~                |                  |
|     |           | T245   | `                | `                |                  |
|     |           | T623   | [ARROW UP]       | [ARROW UP]       |                  |
|     |           | T624   | [ARROW DOWN]     | [ARROW DOWN]     |                  |
|     |           | T625   | [INSERT]         |                  |                  |
|     |           | T634   | [ARROW LEFT]     | [ARROW LEFT]     |                  |
|     |           | T635   | [ARROW RIGHT]    | [ARROW RIGHT]    |                  |
|     |           | T645   |                  | [MENU]           |                  |
|     | 4 Fingers | T1234  | [TAB]            | [TAB]            |                  |
|     |           | T2345  | [ENTER]          | [ENTER]          |                  |
|     |           | T1235  |                  |                  |                  |
|     |           | T1245  | [PAGE UP]        |                  |                  |
|     |           | T1345  | [PAGE DOWN]      |                  |                  |
|     |           | T6234  | [ESC]            | [ESC]            |                  |
|     |           | T6235  | [ALT/OPTION]     | [ALT/OPTION]     |                  |
|     |           | T6245  | [ALT_GR]         | [ALT_GR]         |                  |
|     |           | T6345  | [Command/Windows]| [Command /Windows]|                 |
|     | 5         | T12345 | {SERIE 0}        | {SERIE 0}        | {SERIE 0}        |

|  |  |  | Series 0 | Series 1 | |
|---|---|---|---|---|---|
|  |  |  | Level 0 | Level-1 | Level-2 |
| SWIPE | 1 Finger | S1.C | h | 6 | |
|  |  | S2.C | ; | ; | |
|  |  | S3.C | ' | ' | |
|  |  | S4.C | ! | ! | |
|  |  | S5.C | ? | ? | |
|  |  | S1.K | [BACKSPACE] | [BACKSPACE] | |
|  |  | S2.K | i | 7 | |
|  |  | S3.K | n | 8 | |
|  |  | S4.K | r | 9 | |
|  |  | S5.K | s | 0 | |
|  | 2 Fingers | S23.C | : | : | |
|  |  | S34.C | " | " | |
|  |  | S45.C | ; | ; | |
|  |  | S24.C |  | £ | |
|  |  | S25.C |  | ¥ | |
|  |  | S35.C |  | ¢ | |
|  |  | S23.K | v | < | |
|  |  | S34.K | k | > | |
|  |  | S45.K | x |  | |
|  |  | S24.K | $ | $ | |
|  |  | S25.K | [DELETE] | [DELETE] | |
|  |  | S35.K |  | € | |
|  | 3 Fingers | S234.C | § | § | |
|  |  | S345.C | ° | ° | |
|  |  | S234.K | @ | @ | |
|  |  | S345.K | # | # | |
|  |  | S235.C |  |  | |
|  |  | S245.C | [SCROLL LOCK] |  | |
|  |  | S235.K | [PAUSE] |  | |
|  |  | S245.K | [BREAK] |  | |
|  | 4 Fgs | S2345.C |  |  | |
|  |  | S2345.K |  |  | |
| PINCHES | 2 Fingers | P12.I | g | \| | |
|  |  | P13.I | w | % | |
|  |  | P14.I | y | & | |
|  |  | P15.I | b | ^ | |
|  |  | P12.O |  |  | |
|  |  | P13.O |  |  | |
|  |  | P14.O |  |  | |
|  |  | P15.O |  |  | |
|  | 3 Fingers | P123.I | {SERIE 1 DOWN} | {SERIE 1 DOWN} | {SERIE 1 DOWN} |
|  |  | P124.I | {SERIE 2 DOWN} | {SERIE 2 DOWN} | {SERIE 2 DOWN} |
|  |  | P125.I |  |  |  |
|  |  | P134.I |  |  |  |
|  |  | P135.I | [CTRL] | [CTRL] |  |
|  |  | P145.I |  |  |  |
|  |  | P123.O | {SERIE 1 UP} | {SERIE 1 UP} | {SERIE 1 UP} |
|  |  | P124.O | {SERIE 2 UP} | {SERIE 2 UP} | {SERIE 2 UP} |
|  |  | P125.O |  |  |  |
|  |  | P134.O | [HOME] | [HOME] |  |
|  |  | P135.O | [END] | [END] |  |
|  |  | P145.O | [PRT SCRN] |  |  |
|  | 4 Fingers | P1234.I |  |  |  |
|  |  | P1235.I |  |  |  |
|  |  | P1245.I |  |  |  |
|  |  | P1345.I |  |  |  |
|  |  | P1234.O |  |  |  |
|  |  | P1235.O |  |  |  |
|  |  | P1245.O |  |  |  |
|  |  | P1345.O |  |  |  |
|  | 5 Fgs | P12345.I |  |  |  |
|  |  | P12345.O |  |  |  |

Example of Application: Notepad

2 Handed Typing

While the above description has been focused on a single-handed keyboard, the input interface may also be operated as a 2-handed interface provided that the touch-sensitive interface 150 is able to detect 10 simultaneous gestures and sufficient space for each of the input locations for a 2-handed interface is available.

Figure 18:
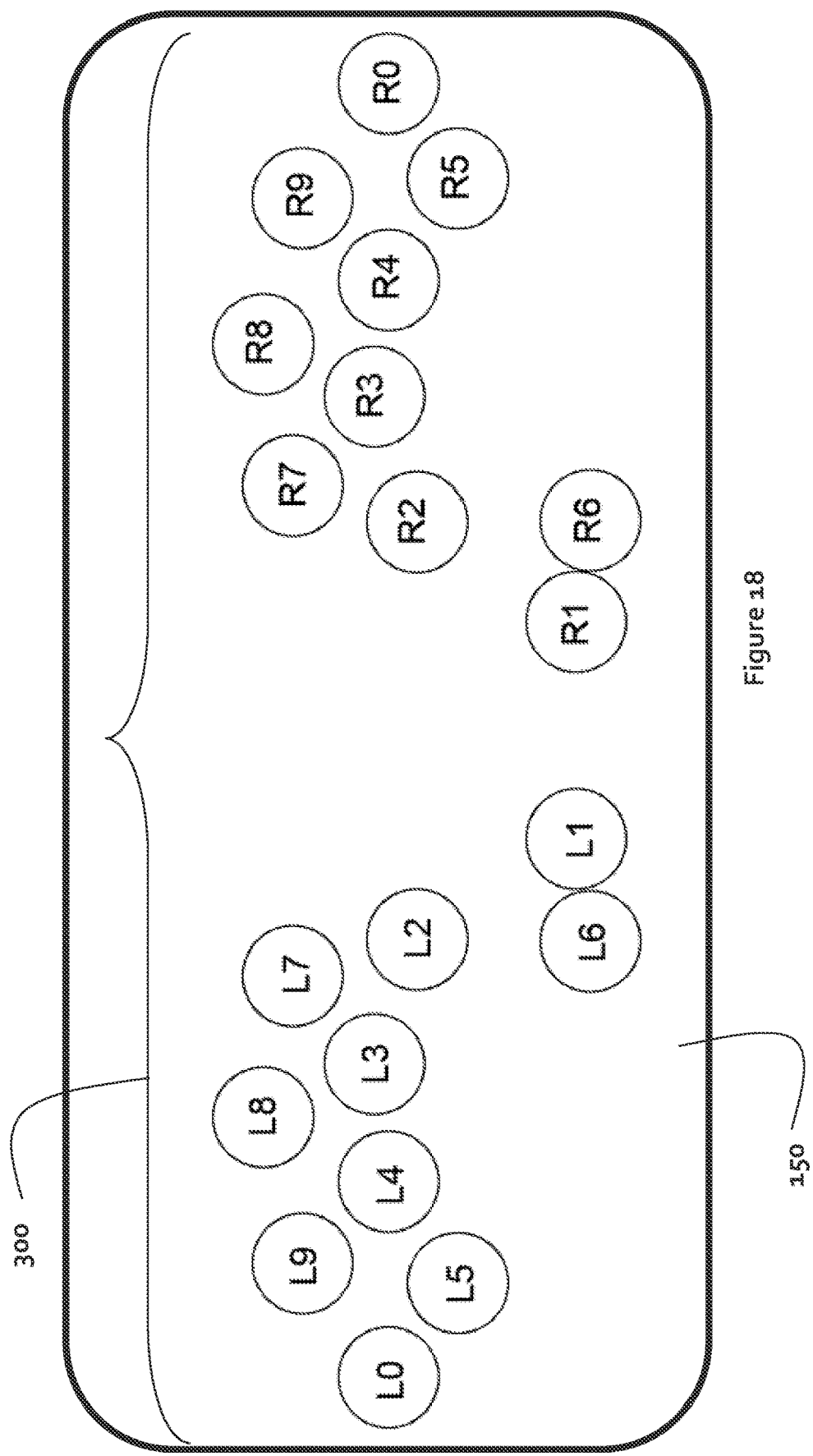
FIG. 18 shows an arrangement of a 2-handed version of the input command interface (including primary input locations and optional secondary input locations) as disclosed herein on a touch sensitive interface.

A particular arrangement of a two-handed keyboard layout 300 is shown in FIG. 18. Rather than being numbered from 0 to 9 as for the one-handed version, the input locations for the 2-handed interface 300 are advantageously are numbered as follows:

R1: right thumb
R2: right index finger
R3: right middle finger
R4: right ring finger
R5: right little finger R6: additional right area for the thumb
R7, R8, R9, R0: optional secondary extended areas for the right index finger, right middle finger, right ring finger and right little finger respectively.
L1: left thumb
L2: left index finger
L3: left middle finger
L4: left ring finger
L5: left little finger
L6: additional left area for the thumb
L7, L8, L9, L0: optional secondary extended areas for the left index finger, left middle finger, left ring finger and left little finger respectively.

The number of possible combinations with 2 hands increases considerably:
Left Hand: 108 combinations
Right Hand: +108 combinations
Both Left Hand and Right Hand: +(108×108)
Total: =11880 combinations The benefits of 2-handed interface 300 include:
To provide a typing speed equivalent to a fast touch typist on a standard keyboard.
For stenography.
For languages comprising large character sets.

Keysets can be created with a reference to the L0 to L9 areas and R0 to R9 areas. Depending on the initial detection of one or two hands the gestures will be based either with 0-9, or with L0-9 and R0-9 respectively. For example for a tap with the right thumb we would get either T1 (one hand initially detected) or TR1 (two hands initially detected).

Depending on the gesture received by the system T1 or TR1:
If an active Keyset has a Key with a gesture T1, it would be selected, and if an active Keyset has a Key with a gesture TR1, it would be selected. This means that the user is able to type with either one hand or two hands without having to switch any settings at all.

Learning Methodology

The learning method for a user to practice input operations using the interface described above (e.g. one-handed interface 100 or two-handed interface 30) is based on a progressive learning methodology. It is important to be as efficient with all the letters equally. For this purpose the preferred learning approach is based on:
Learning a small amount of input gestures associated with particular characters at a time (e.g. 4-5 input gestures or characters);
Practicing with an in-built metronome to start at a low speed and to progressively increase the training speed;
Practicing until a good accuracy (for example, at least 95% or above) at a medium speed (for example: 100 characters per minute) is reached, before learning the gestures associated with another group of letters;
Preferably; the new letters should be all from a similar combination. For example: only single finger Tap, or only two fingers Pinch In; and finally
Practicing with random permutations of the selected Keys.

FIG. 19 shows a list of lessons from an exemplary training module. When two groups of letters have been successfully practiced, they can then be practiced together. When all groups have been practiced together the user can practice on pangrams, texts, or a random selection of all the characters.

The frequency of letters being irregular, it is best to practice with pangrams or random selection. For example, the frequency of the letter "e" in the English language is 12.7% while "z" is 0.074%, so practicing with a text means that the user won't perform as well with the letter "z", because they would not have practiced it as much. However practicing with a text is important too because this is usually what is used to measure the typing speed, and this is obviously what the user will eventually need to be proficient in typing.

Figure 20:
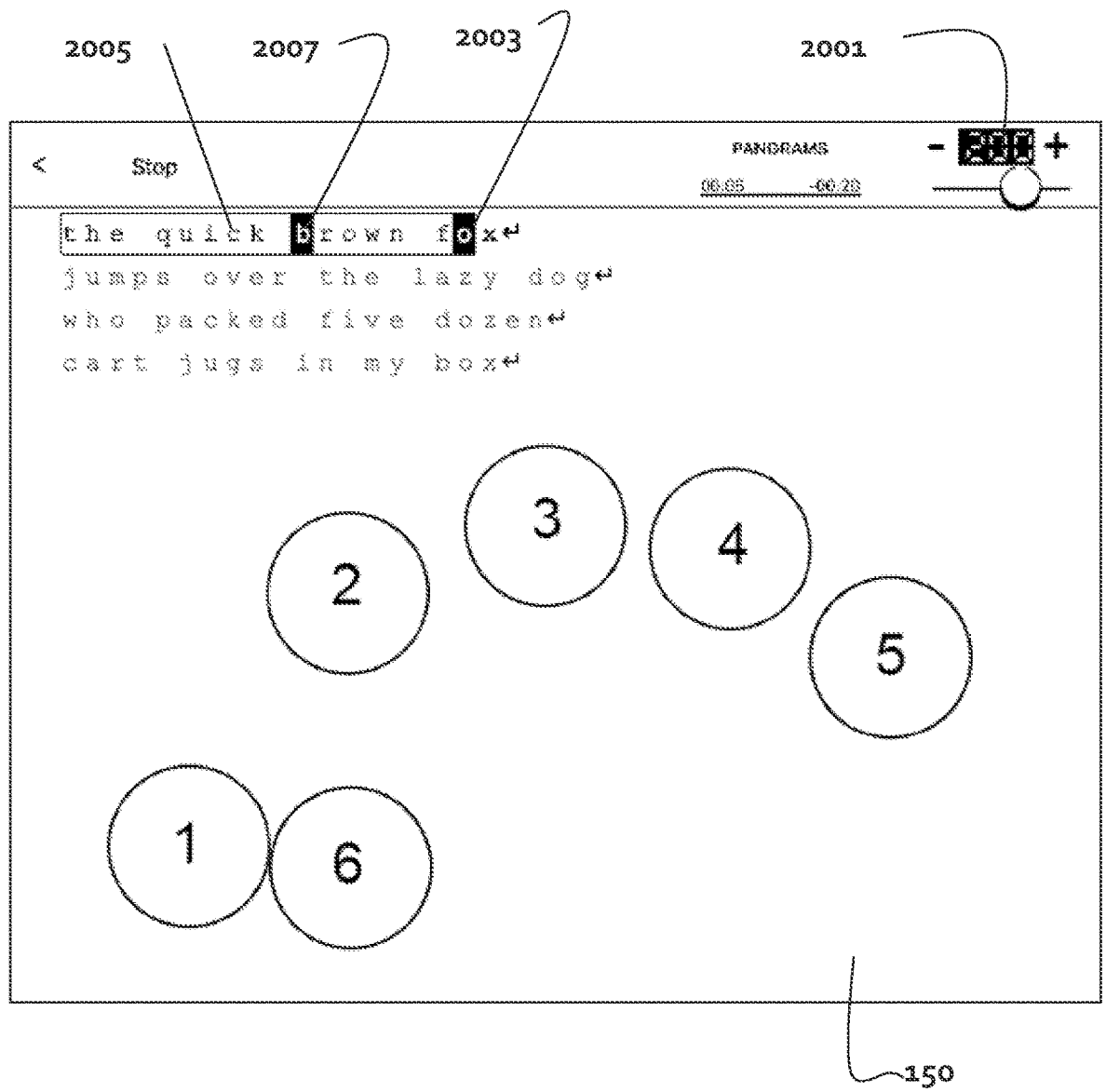
FIG. 20 shows a lesson in progress while the user practices.
Figure 21A:
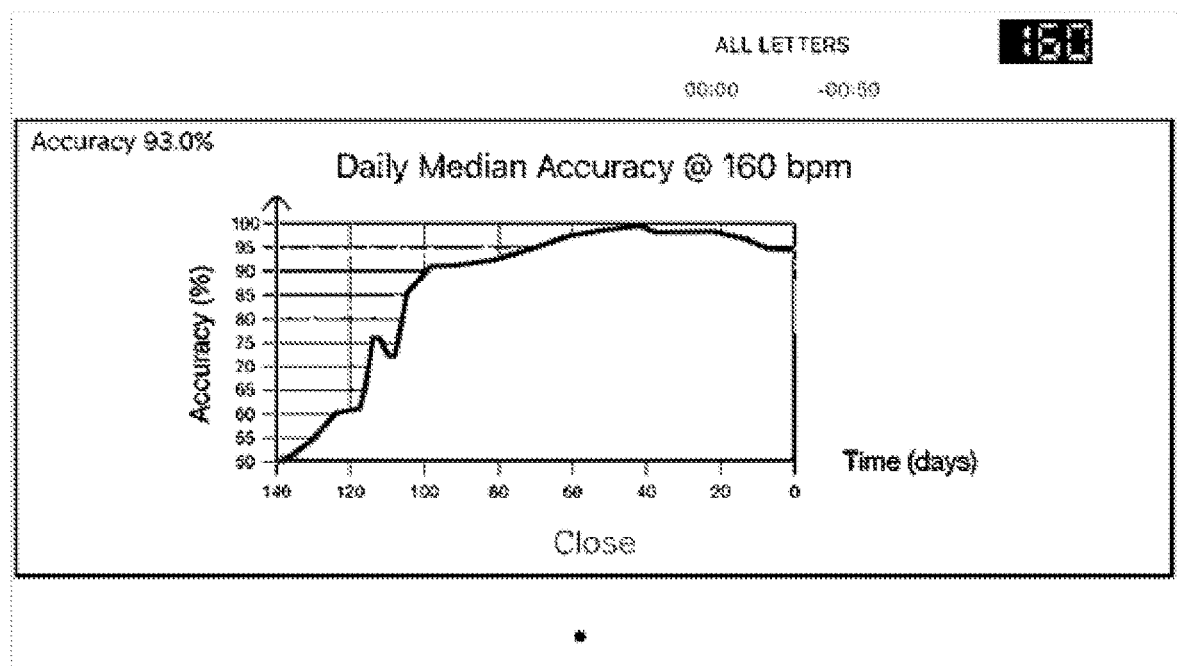
FIGS. 21A and 21B shows the lesson's statistics to track the user's progress over time, and also to track the user's optimal typing speed where the user should achieve at least 98% accuracy.
Figure 21B:
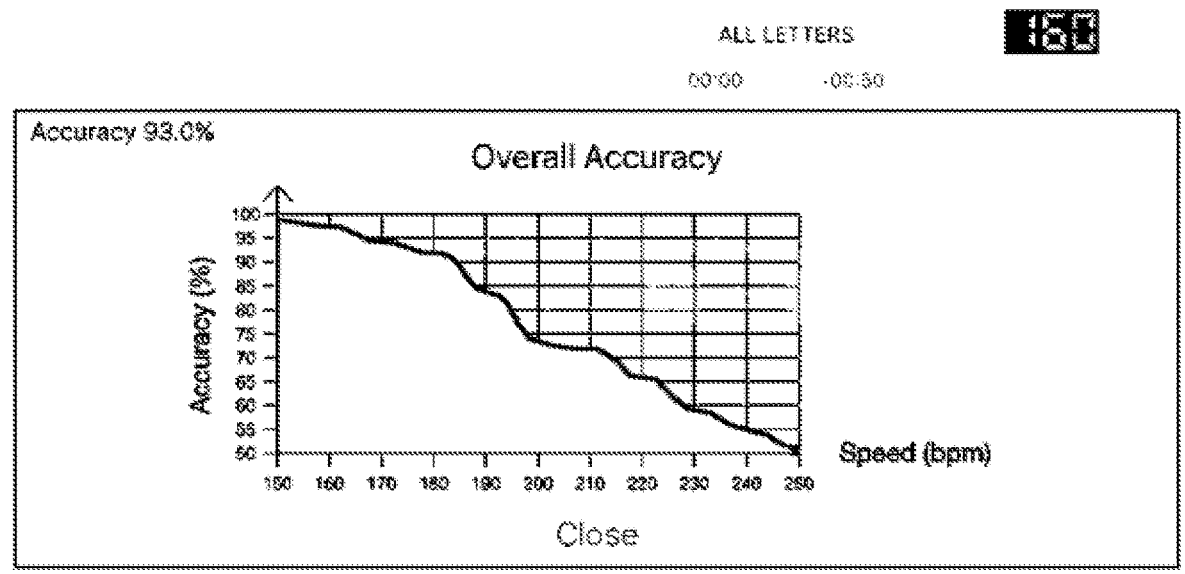

FIG. 20 shows a lesson in progress from the example training module. The user selects his/her current training speed 2001. The lesson starts when the user places his/her hand on the screen, which starts the hand detection process. Depending on the training speed, the user will have a certain amount of time to type the selected Key (identified by a shaded character e.g. 2003). If the user is successful the letter is greyed out, otherwise the letter becomes red (2005) indicating an error. The user can adjusts the tempo to practice at his/her optimal speed and slightly above, trying to achieve between 90 to 100% accuracy. Practicing slightly above the optimal speed will enable a user to increase his/her optimal speed;

At the end of the lesson, the user is presented with statistics on accuracy and progress (see for example FIGS. 21A and 21B). Practicing within the user's range of accuracy between 85% and 100% is a good methodology to increase typing speed. FIG. 21A shows a particular user's evolution of their accuracy over time at the current lesson speed. FIG. 21B shows the user's weighted average accuracy for the range of speeds that they have trained at (the most recent lessons are weighted more to calculate the average speed).

Keyset Optimisation

Figure 22:
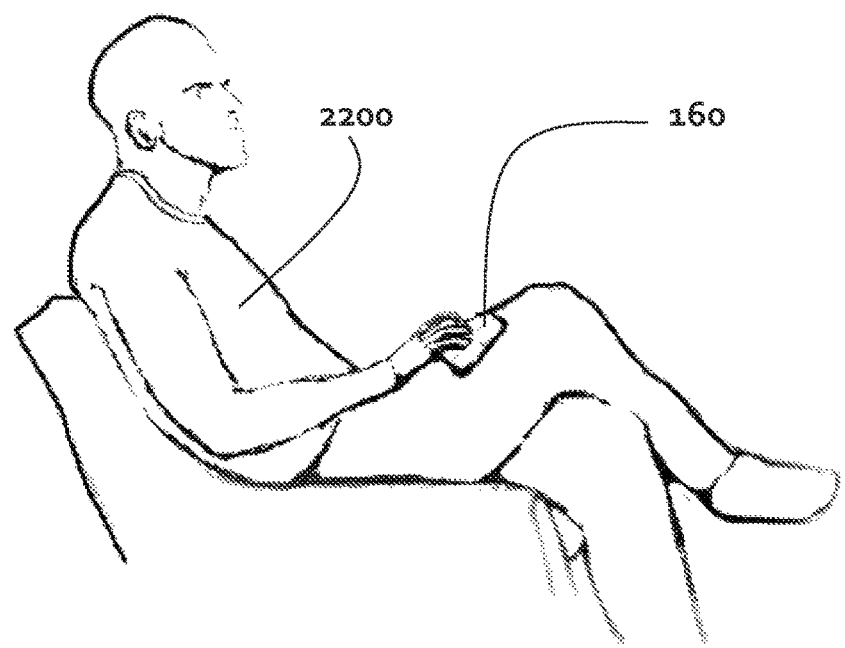
FIG. 22 shows an example arrangement of the input command interface disclosed herein being used on a touch surface integrated into an item of clothing such as a pair of trousers to be worn by the user. The touch surface could be connected to a smartphone, a tablet or a computer, using either a wired or a wireless connection. This would allow a user to type without having a phone, a tablet or a computer screen directly in front of him/her.

Keysets, particularly customised keyset mappings, may be shared by users in an open format, e.g. users that have created optimised or custom keysets could publish them via, for example, a social media network, for other users to use.
Example of keyset optimisations may include:
Professional or Scientific environments where a number of quick text or special characters could be made more accessible.
Advanced research on language specific optimisations.
Bi-lingual people that are frequently using a mix of languages with different character sets.
Optimisations for languages that have a large set of symbols
Optimisations for people with disability.
Specific application shortcuts Specific Hardware To type text in the currently available methods using physical keyboard or a input command interface on a mobile computing device, users currently need to be face to face with a screen. Utilising the input command interface 100 as disclosed herein it is possible to provide a flexible touchpad connected to a smartphone or a tablet (with or without a physical electrical connection i.e. wired or wireless using a suitable wireless protocol such as Bluetooth or the like). A flexible touchpad interface 160 could, for example be integrally incorporated into an article of clothing such as, for example, sewn into a pair of pants such as is depicted in use by a user 2200 in FIG. 22. A software application adapted to translate inputted gestures to an input to the computing device associated with the interface 160 invention could allow the user to, for example:
Think and keep the focus on his/her ideas without having to look at a screen and possibly lose their train of thought.
Discuss with someone else and type his/her comments without losing eye contact.

Attend a lecture and keep his/her eyes on the lecturer and his/her presentation whilst making notes to their connected computing device.

It will be readily appreciated by the skilled addressee that the gesture based input interface disclosed herein is in no way limited to computer keyboards. As it has been shown with the mapping of a QWERTY Keyboard, a similar mapping may be provided for any system having a user input interface. Further examples include:

- mapping each button of a remote control device (e.g. for a television or media device) to a particular gesture in a memory bank associated with a touch interface;
- mapping each dial and button of a dishwasher, microwave oven or other household appliance to gestures on a touch interface;
- mapping each dial, button or switch in a car or an airplane cockpit;
- mapping commands for controlling a military or an industrial system;
- Among many others as would be readily appreciated by the skilled addressee.

As can be appreciated, all buttons, dials, switches, or input command devices may easily be replaced by only a single touch sensitive interface and commands delivered by appropriate touch gestures as discussed above.

Figure 23:
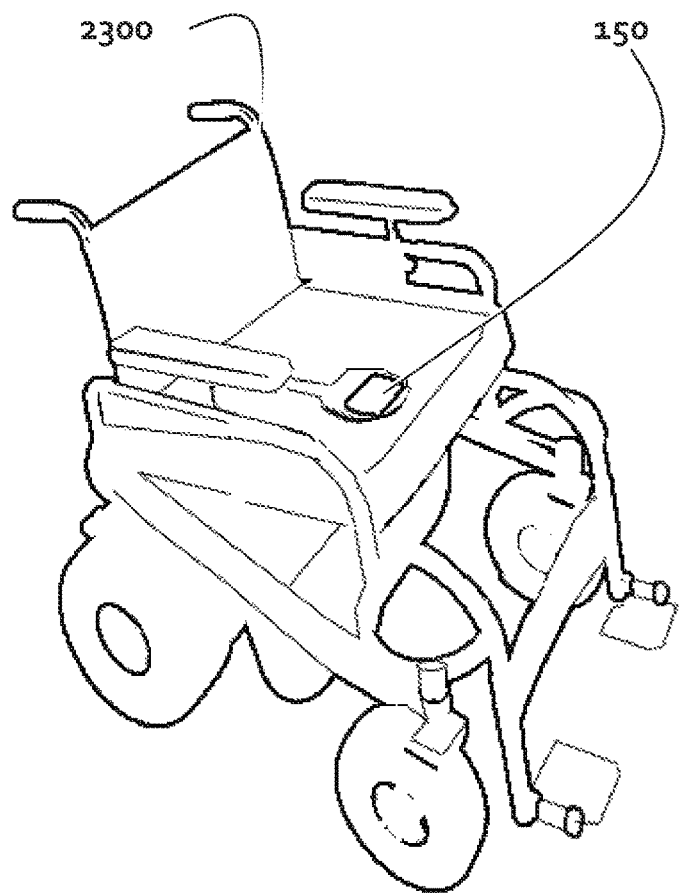
FIG. 23 shows an example arrangement of the input command interface disclosed herein being integrated with a mobility device such as a wheelchair.

For disabled user the touchpad 150 could be installed on a mobility device such as a wheelchair 2300 such as is depicted in the example arrangement of FIG. 23 positioned at the end of the user's natural arm location to allow a wheelchair-bound user to, for example:

- Control a tablet computer mounted on the chair and being able to write emails, take notes and browse the Internet.
- Control a text-to-speech software to be able to "talk".
- Control a range of functions on the wheelchair like "Emergency Call", "Return to Home", etc. If such functions were available.
- If the application running the keyboard is connected to a text-to-speech software, it could allow someone having even a limited mobility of their fingers to be able to "talk".
- It could also be connected to a tablet or smart phone.

Interpretation
Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function:

Furthermore, some of the embodiments are described herein as a method or combination of elements of a method that can be implemented by a processor or a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment", "an embodiment", "one arrangement" or "an arrangement" means that a particular feature, structure or characteristic described in connection with the embodiment/arrangement is included in at least one embodiment/arrangement of the present invention. Thus, appearances of the phrases "in one embodiment/arrangement" or "in an embodiment/arrangement" in various places throughout this specification are not necessarily all referring to the same embodiment/arrangement, but may. Furthermore, the particular features, structures or characteristics may be combined in any suitable manner, as would be apparent to one of ordinary skill in the art from this disclosure, in one or more embodiments/arrangements.

Similarly it should be appreciated that in the above description of example embodiments/arrangements of the invention, various features of the invention are sometimes grouped together in a single embodiment/arrangement, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment/arrangement. Thus, the claims following the Detailed Description are hereby expressly incorporated into this Detailed Description, with each claim standing on its own as a separate embodiment/arrangement of this invention.

Furthermore, while some embodiments/arrangements described herein include some but not other features included in other embodiments/arrangements, combinations of features of different embodiments/arrangements are meant to be within the scope of the invention, and form different embodiments/arrangements, as would be understood by those in the art. For example, in the following claims, any of the claimed embodiments/arrangements can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including:

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: "including" or "which includes" or "that includes" as used herein is also an open term that also means "including at least" the elements/features that follow the term, but not excluding others. Thus, including is synonymous with and means comprising.

Scope of Invention

Thus, while there has been described what are believed to be the preferred arrangements of the invention, those skilled in the art will recognize that other and further modifications may be made thereto without departing from the spirit of the invention, and it is intended to claim all such changes and modifications as fall within the scope of the invention. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable not merely to just the to the mobile device industries, but also to any system that requires a user input by means of a physical interface, ranging from keyboards to buttons, dials, switches, and beyond.

It will be appreciated that the methods/apparatus/devices/systems described/illustrated above at least substantially provide a methods and systems and apparatus for input devices and applications for electronic devices comprising a multi-touch-sensitive interface.

The methods, systems and apparatus disclosed herein, and/or shown in the drawings, are presented by way of example only and are not limiting as to the scope of the invention. Unless otherwise specifically stated, individual aspects and components of the methods, systems and apparatus may be modified, or may have been substituted therefore known equivalents, or as yet unknown substitutes such as may be developed in the future or such as may be found to be acceptable substitutes in the future. The methods, systems and apparatus may also be modified for a variety of applications while remaining within the scope and spirit of the claimed invention, since the range of potential applications is great, and since it is intended that the present methods, systems and apparatus be adaptable to many such variations.

The claims defining the invention are as follows:

1. A method for providing an input command to a computing device, the computing device comprising:
   a multi-touch sensitive interface;
   one or more processors adapted to control the multi-touch sensitive interface and to receive multi-touch input data therefrom; and
   memory adapted for storage of computer instructions;
   the method comprising the steps of:
     controlling the multi-touch sensitive interface to define a first plurality of input locations corresponding to a location on the multi-touch sensitive interface of the multi-touch input data, the first plurality of input locations including respective input locations on the multi-touch sensitive interface for each of a user's fingers and thumb;
     monitoring the multi-touch sensitive interface for the multi-touch input data corresponding to a user desire to input command data to the computing device;
     receiving touch signal data in respect of one or more of the input locations;
     correlating the touch signal data to an input command;
     processing the input command using the one or more processors to perform an action associated with the input command; and
     controlling the multi-touch interface to define a second plurality of input locations corresponding to the location of the multi-touch input data, each input location of the second plurality of input locations being defined in a location with respect to an associated input location of the first plurality of input locations, wherein an input location of the second plurality of input locations is located on a common arc with respect to the respective associated input location of the first plurality of input locations to form a plurality of associated pairs of input locations, and wherein the common arc of a selected associated pair of input locations is associated with the natural arc of motion of a respective one of the user's fingers adapted to interact with the selected associated pair of input locations, wherein the input command comprises:

a control command, wherein the control command comprises a command for activating an input command modifier, and wherein the input command modifier comprises a command to activate a predefined memory bank comprising a plurality of gesture mappings associated with an associated plurality of input commands.

2. A method as claimed in claim 1 wherein the control command comprises a command or partial command for selecting a desired lookup table of textural characters associated with the multi-touch input data.

3. A method as claimed in claim 1 wherein the input command modifier comprises one or more of a SHIFT, ALT or CTRL key input modifier command.

4. A method as claimed in claim 1 wherein the input command comprises a user input to activate a function of a device to which the touch-sensitive interface is connected.

5. A method as claimed in claim 1 wherein the input command corresponds to a command to input a textural input to the computing device.

6. A method as claimed in claim 1 wherein the one or more processors are further adapted to:

monitor location data corresponding to multi-touch input data from user interactions on the multi-touch sensitive interface corresponding to the multi-touch input data and store the location data in memory;

compare the location data with the centre of the input locations;

from the comparison, determine a drift in the natural location of each of user's finger positions with respect to the input locations;

where a drift is determined re-define the location of each input location where a drift is detected in accordance with the location data, such as to reposition the input locations in accordance with the natural location of the user's fingers.

7. A method as claimed in claim 1 wherein the multi-touch sensitive interface comprises a touch sensitive interface.

8. A method as claimed in claim 1 wherein the correlation of the touch signal data to an input command comprises a look-up table stored in the memory.

9. A method as claimed in claim 8 wherein the look-up table is customisable.

* * * * *